(12) United States Patent
Stryzheus et al.

(10) Patent No.: US 12,456,170 B2
(45) Date of Patent: Oct. 28, 2025

(54) INSPECTION SYSTEM AND METHOD

(71) Applicant: The Boeing Company, Arlington, VA (US)

(72) Inventors: Veniamin Stryzheus, Kent, WA (US); Matthew J. Chen, Seattle, WA (US)

(73) Assignee: The Boeing Company, Arlington, VA (US)

( * ) Notice: Subject to any disclaimer, the term of this patent is extended or adjusted under 35 U.S.C. 154(b) by 69 days.

(21) Appl. No.: 18/473,157

(22) Filed: Sep. 22, 2023

(65) Prior Publication Data

US 2025/0104190 A1    Mar. 27, 2025

(51) Int. Cl.
| | |
|---|---|
| G06T 5/50 | (2006.01) |
| G06T 7/00 | (2017.01) |
| H04N 5/265 | (2006.01) |
| H04N 23/54 | (2023.01) |
| H04N 23/56 | (2023.01) |
| H04N 23/90 | (2023.01) |

(52) U.S. Cl.
CPC .............. *G06T 5/50* (2013.01); *G06T 7/0004* (2013.01); *H04N 5/265* (2013.01); *H04N 23/54* (2023.01); *H04N 23/56* (2023.01); *H04N 23/90* (2023.01); *G06T 2200/24* (2013.01); *G06T 2207/20212* (2013.01); *G06T 2207/30108* (2013.01)

(58) Field of Classification Search
CPC ..... G06T 5/50; G06T 7/0004; G06T 2200/24; G06T 2207/20212; G06T 2207/30108; H04N 5/265; H04N 23/54; H04N 23/56; H04N 23/90
See application file for complete search history.

(56) References Cited

U.S. PATENT DOCUMENTS

| | | | |
|---|---|---|---|
| 2011/0228052 A1 | 9/2011 | Ohnishi | |
| 2018/0022621 A1* | 1/2018 | Von Drasek | C02F 5/08 |
| | | | 382/103 |
| 2018/0322647 A1 | 11/2018 | Harrington | |

(Continued)

FOREIGN PATENT DOCUMENTS

WO    2021/174181    9/2021

OTHER PUBLICATIONS

Wikipedia, "Photogrammetry," available at <https://en.wikipedia.org/wiki/Photogrammetry>; retrieved on Aug. 26, 2023.

(Continued)

*Primary Examiner* — Nasim N Nirjhar

(57) ABSTRACT

An inspection system for capturing a topography of a surface includes a support frame configured to be positioned over the surface, at least three light sources configured to be mounted at different locations on the support frame, and at least two cameras each having a viewing direction and configured to be mounted at different locations on the support frame in a manner such that the viewing direction of each camera points generally toward a common region of the surface. The inspection system also includes a processor configured to: temporarily activate the light sources one at a time and cause all the cameras to capture a respective plurality of images of the common region each time a light source is activated, and combine the images in a manner that results in a reconstructed surface representing the topography of the common region.

20 Claims, 18 Drawing Sheets

(56) References Cited

U.S. PATENT DOCUMENTS

| | | | |
|---|---|---|---|
| 2020/0134773 A1 | 4/2020 | Pinter | |
| 2022/0026397 A1* | 1/2022 | Kamel | G01N 29/225 |
| 2023/0031023 A1* | 2/2023 | Wang | H04N 23/675 |
| 2024/0221341 A1* | 7/2024 | Colonna | G06T 7/0002 |
| 2024/0296620 A1* | 9/2024 | Amavasai | G06T 7/60 |
| 2024/0351705 A1* | 10/2024 | Ferry | B64D 47/08 |

OTHER PUBLICATIONS

Wikipedia, "Photometric stereo," available at <https://en.wikipedia.org/wiki/Photometric_stereo#>; retrieved on Aug. 26, 2023.
EPO, Extended European Search Report, application No. 24185691, dated Dec. 12, 2024.

* cited by examiner

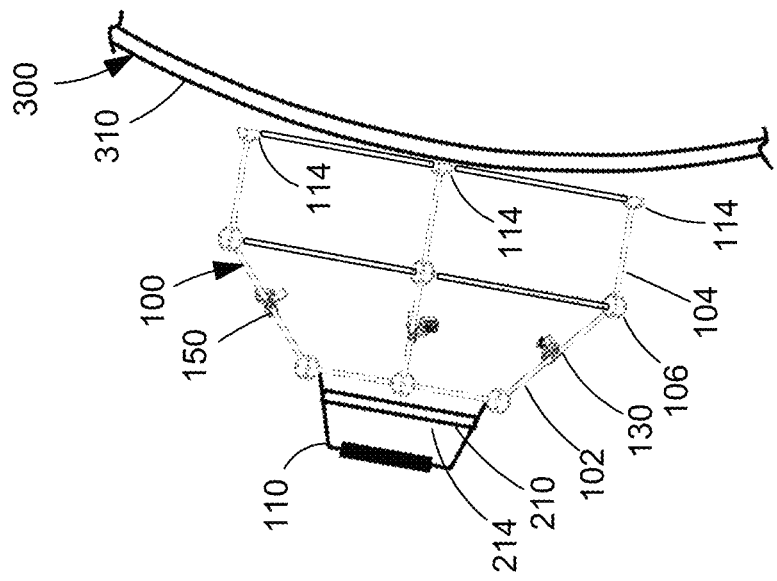
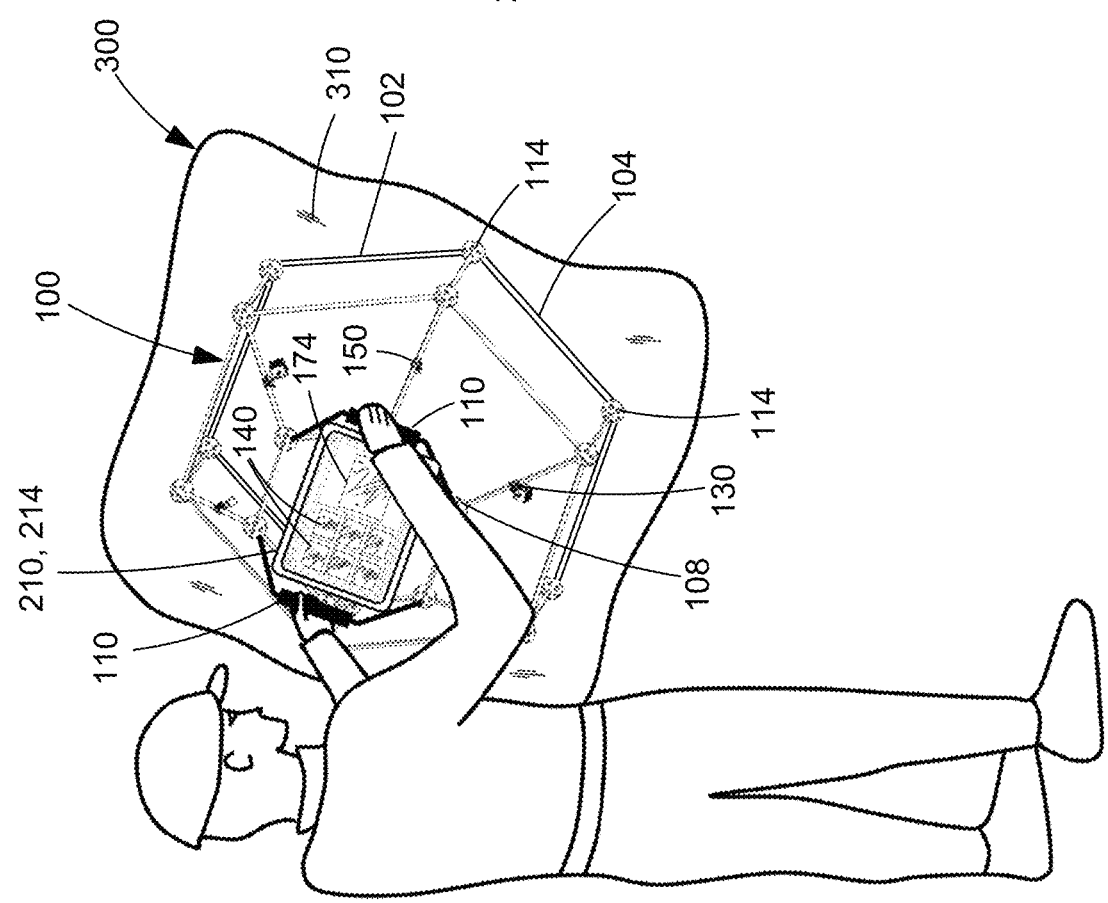
FIG. 6
FIG. 5

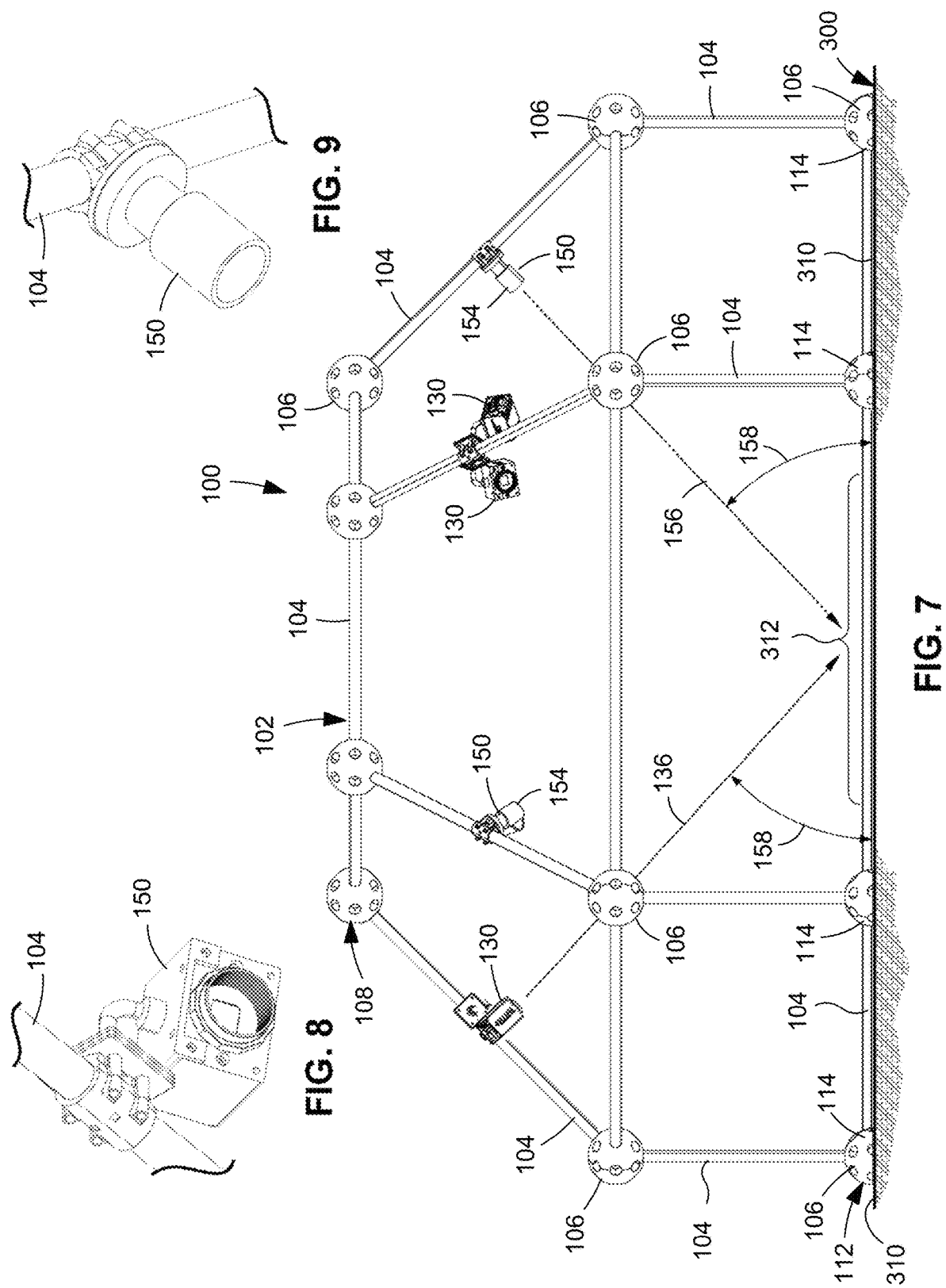

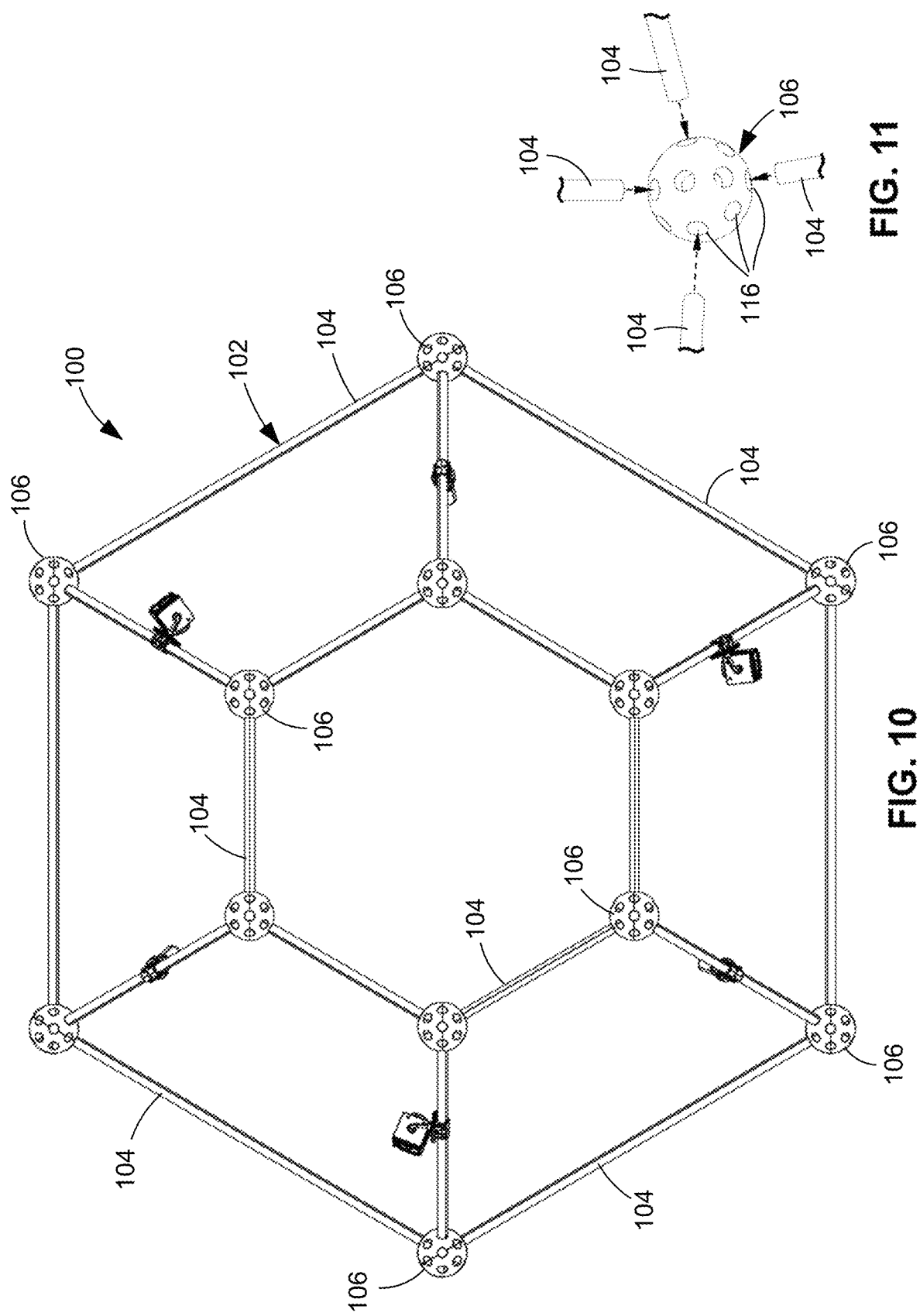

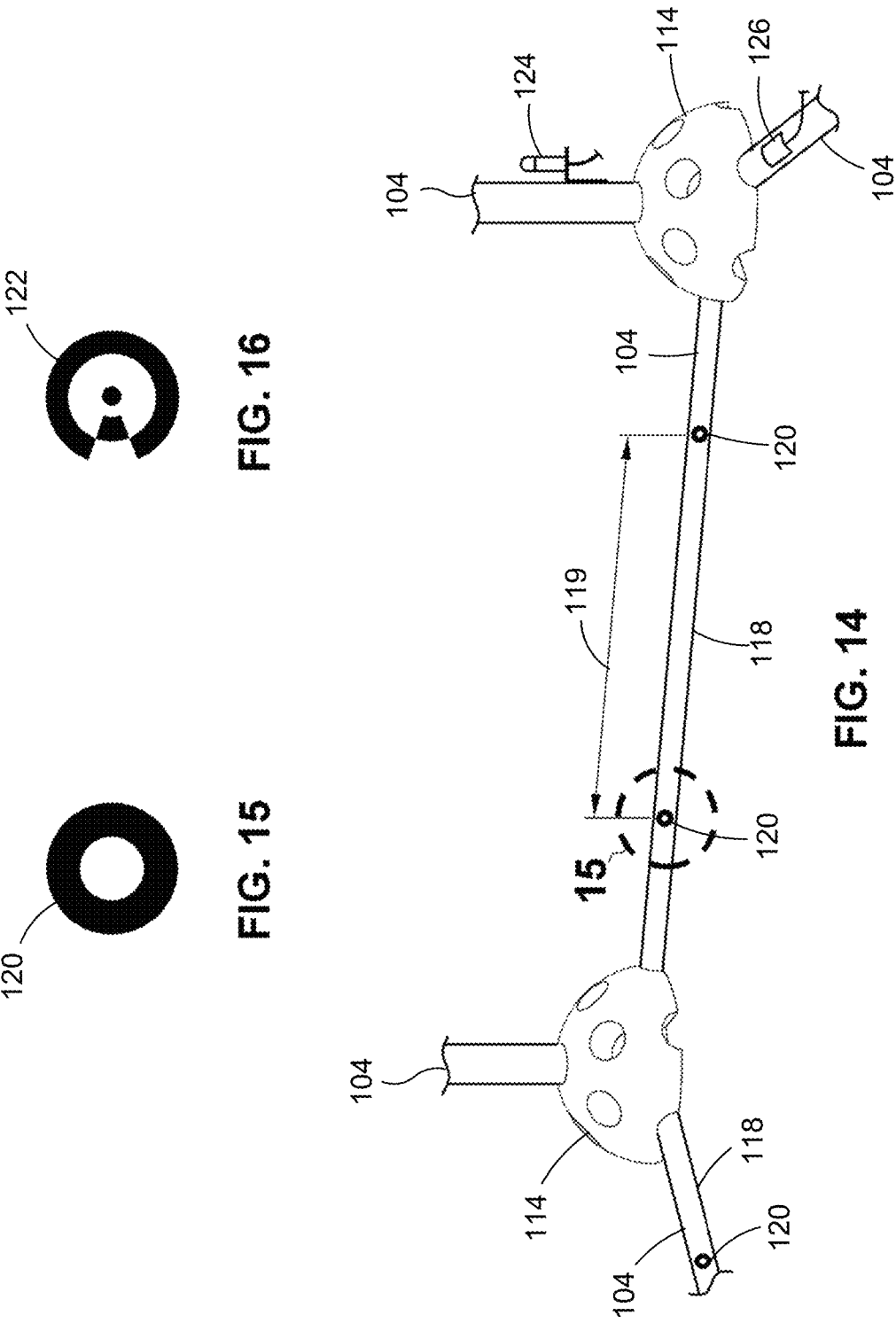

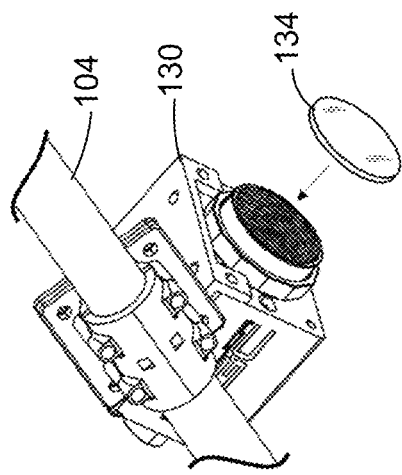
FIG. 19
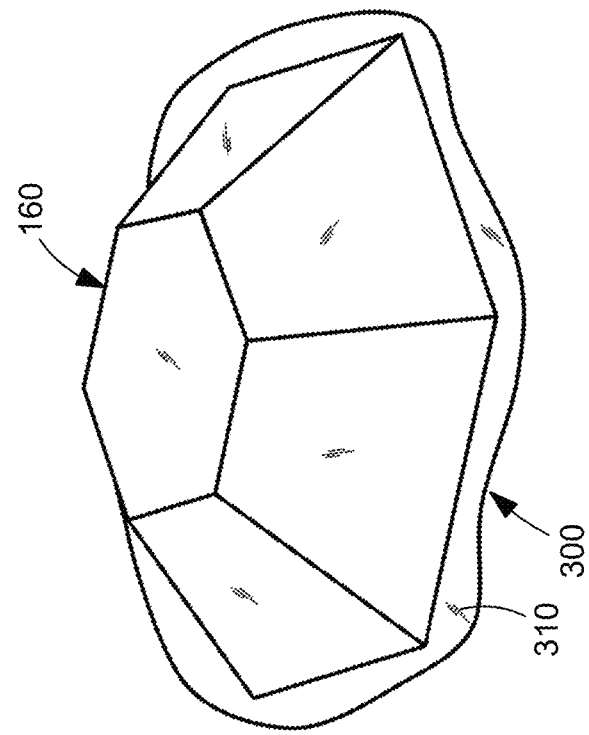
FIG. 18
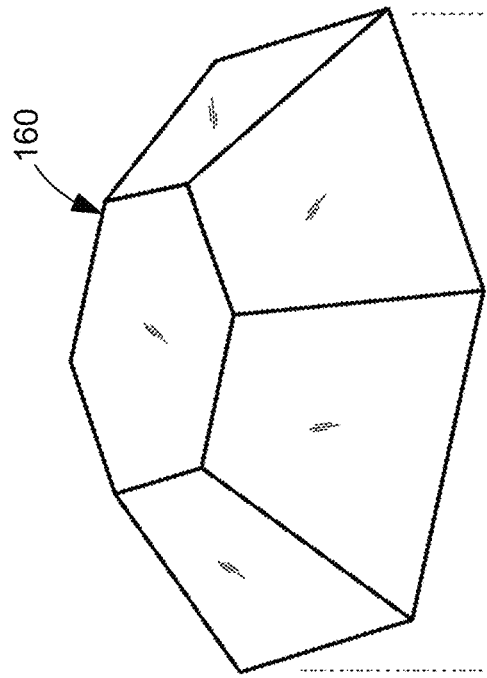
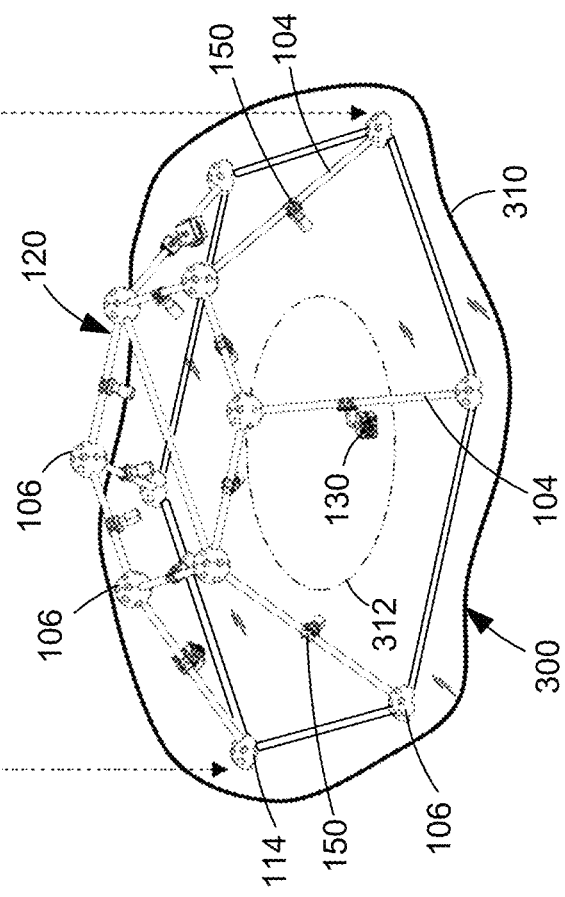
FIG. 17

INSPECTION SYSTEM AND METHOD

FIELD

The present disclosure relates generally to inspection systems and, more particularly, to a system and method for inspecting surfaces for imperfections.

BACKGROUND

Detecting and measuring surface imperfections on production parts can be challenging. Part of the challenge in detecting surface imperfections is due to their small size, some of which can only be detected under specific lighting conditions or via tactile methods such as running fingernails over the surface. Detection of surface imperfections early on in the production process is important because it prevents faulty parts from moving down the production line and possibly reaching the final customer. Furthermore, early detection of surface imperfections allows for reworking or replacing defective parts, and adjusting the manufacturing process to prevent future occurrences of surface imperfections.

One conventional approach to inspecting surfaces involves the use of structured light scanners. Although effective in detecting large surface defects such as dents, structured light scanners lack the precision required to detect small surface imperfections such as scratches, gouges, and tool marks due to the inherent low-frequency noise (e.g., irregularities) in surfaces. Laser profilometers are another type of device conventionally used for inspecting surfaces. Although generally effective for their intended purpose, laser profilometers have a relatively small field of view. In addition, laser profilometers have reflection issues that impact their ability to inspect certain types of surfaces.

As can be seen, there exists a need in the art for a system for inspecting surfaces that is capable of detecting small imperfections on a variety of different types of surfaces and which has a relatively large field of view.

SUMMARY

The above-noted needs associated with inspecting surfaces are addressed by the present disclosure, which provides an inspection system for capturing a topography of a surface. The inspection system includes a rigid support frame configured to be positioned over the surface, at least three light sources configured to be mounted at different locations on the support frame, and at least two cameras each having a viewing direction and configured to be mounted at different locations on the support frame in a manner such that the viewing direction of each camera points generally toward a common region of the surface. The inspection system also includes a processor configured to: temporarily activate the light sources one at a time and cause all the cameras to capture a respective plurality of images of the common region each time a light source is activated, and combine the images in a manner that results in a reconstructed surface representing the topography of the common region.

In another example, the inspection system includes a rigid support frame, and a movable platform configured to position the support frame at one or more different locations on the surface. The inspection system also includes at least three light sources configured to be mounted at different locations on the support frame, and at least two cameras each having a viewing direction and configured to be mounted at different locations on the support frame in a manner such that the viewing direction of each camera points generally toward a common region of the surface. Additionally, the inspection system also includes a processor configured to temporarily activate the light sources one at a time and cause all the cameras to capture a respective plurality of images of the common region each time a light source is activated, and combine the images in a manner that corrects for shape distortion and results in a reconstructed surface representing the topography of the common region.

Also disclosed is a method of capturing a topography of a surface. The method includes positioning a rigid support frame over the surface. The support frame has at least three light sources mounted at different locations on the support frame, and at least two cameras each having a viewing direction and mounted at different locations on the support frame in a manner such that the viewing direction of each camera points generally toward a common region of the surface. The method further includes temporarily activating the light sources one at a time and causing all the cameras to capture a respective plurality of images of the common region each time a light source is activated. In addition, the method includes combining the images in a manner that results in a reconstructed surface representing a topography of the common region.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 5 shows an example of the inspection system configured to be manually held in position against a surface under inspection, and having a graphic user interface (GUI—e.g., a tablet) mounted to the support frame for displaying a reconstructed surface generated by the inspection system as a result of combining multiple images captured by the cameras;

FIG. 6 is a side view of the inspection system of FIG. 5 positioned against the surface of the barrel section;

FIG. 7 is a side view of the inspection system showing the cameras having a viewing direction that forms an angle of incidence with the surface under inspection, and further illustrating the light sources having a lighting direction that forms an angle of incidence with the surface;

FIG. 8 shows an example of one of the cameras mounted on one of the beams of the support frame;

FIG. 9 shows an example of one of the light sources mounted on one of the beams of the support frame;

FIG. 10 is a top view of the inspection system of FIG. 7 in an arrangement having a total of three light sources and a total of three cameras mounted on the support frame;

FIG. 11 is an exploded view of a portion of the support frame illustrating a plurality of beams separated away from one of the connecting elements;

FIG. 14 is a magnified view of a portion of the support frame showing reference targets mounted on one of beams;

FIG. 15 is a magnified view of one of the reference targets of FIG. 14;

FIG. 16 shows an example of a reference target configured as a coded target;

FIG. 17 is a partially exploded view of an example of the inspection system having a background light shield;

FIG. 18 shows the inspection system in which the background light shield is assembled to the support frame;

FIG. 19 shows an example of one of the cameras having a lens filter configured to filter out one or more wavelengths of background light;

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

In the present disclosure, the following phrases are used interchangeably: "surface of the structure," "surface of the barrel section," "surface of the skin panel," "surface to be inspected," "surface under inspection," "inspected surface," and "the surface."

Figure 1:
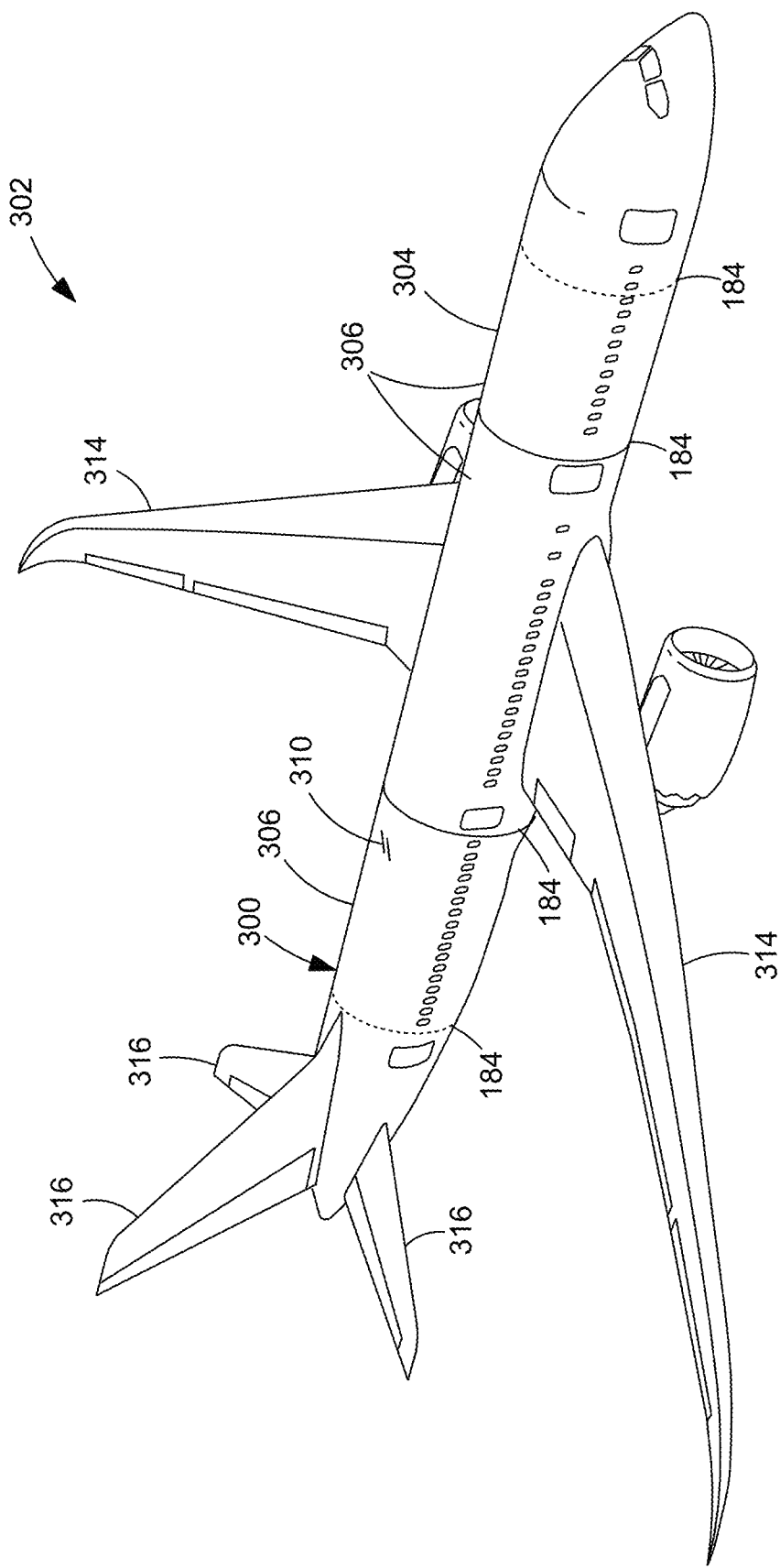
FIG. 1 shows an example of an aircraft.
Figure 21:
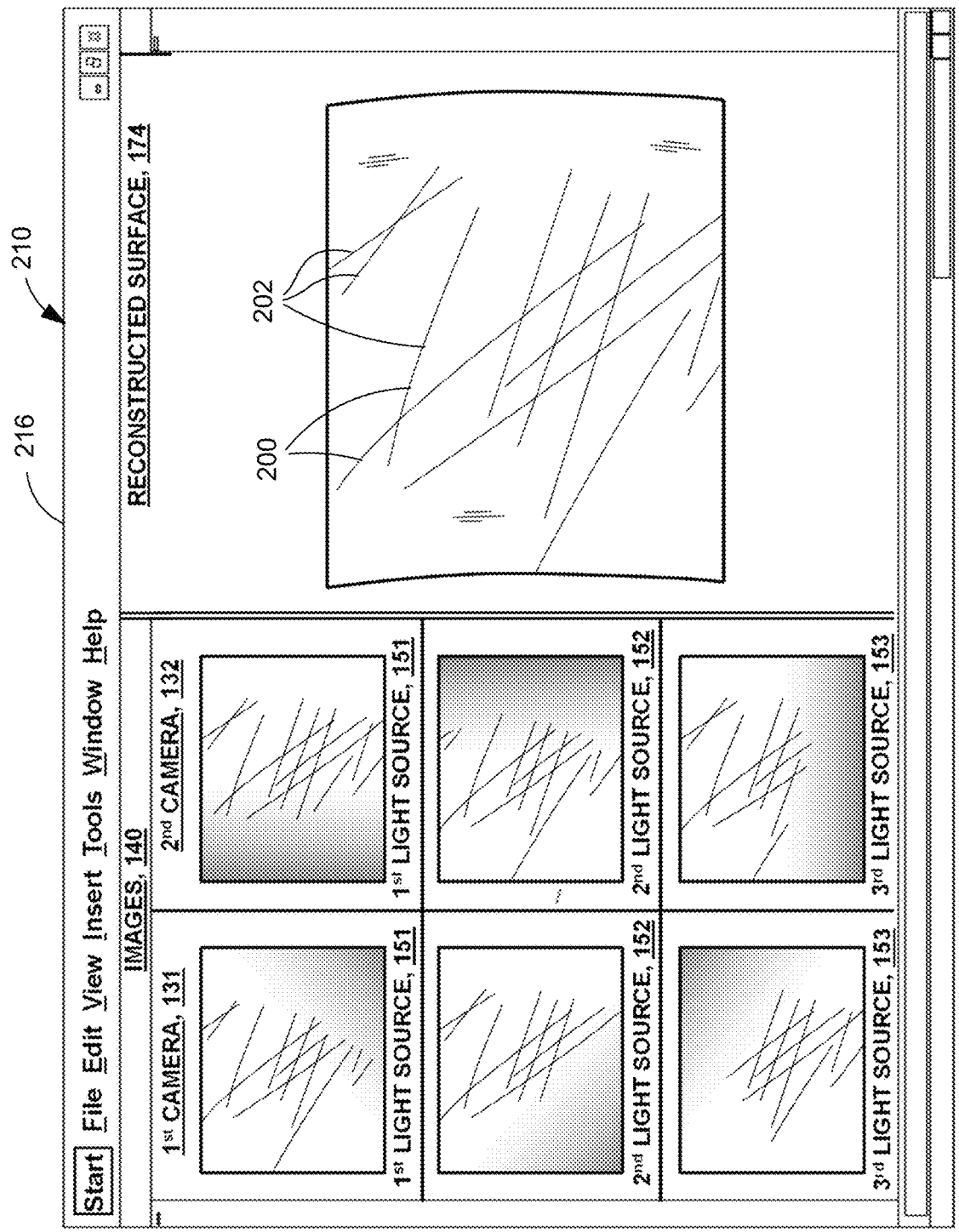
FIG. 21 shows an example of a display screen of the GUI displaying the reconstructed surface of a surface under inspection based on the images captured by the cameras, and illustrating defects in the reconstructed surface in the form of scratches.
Figure 23:
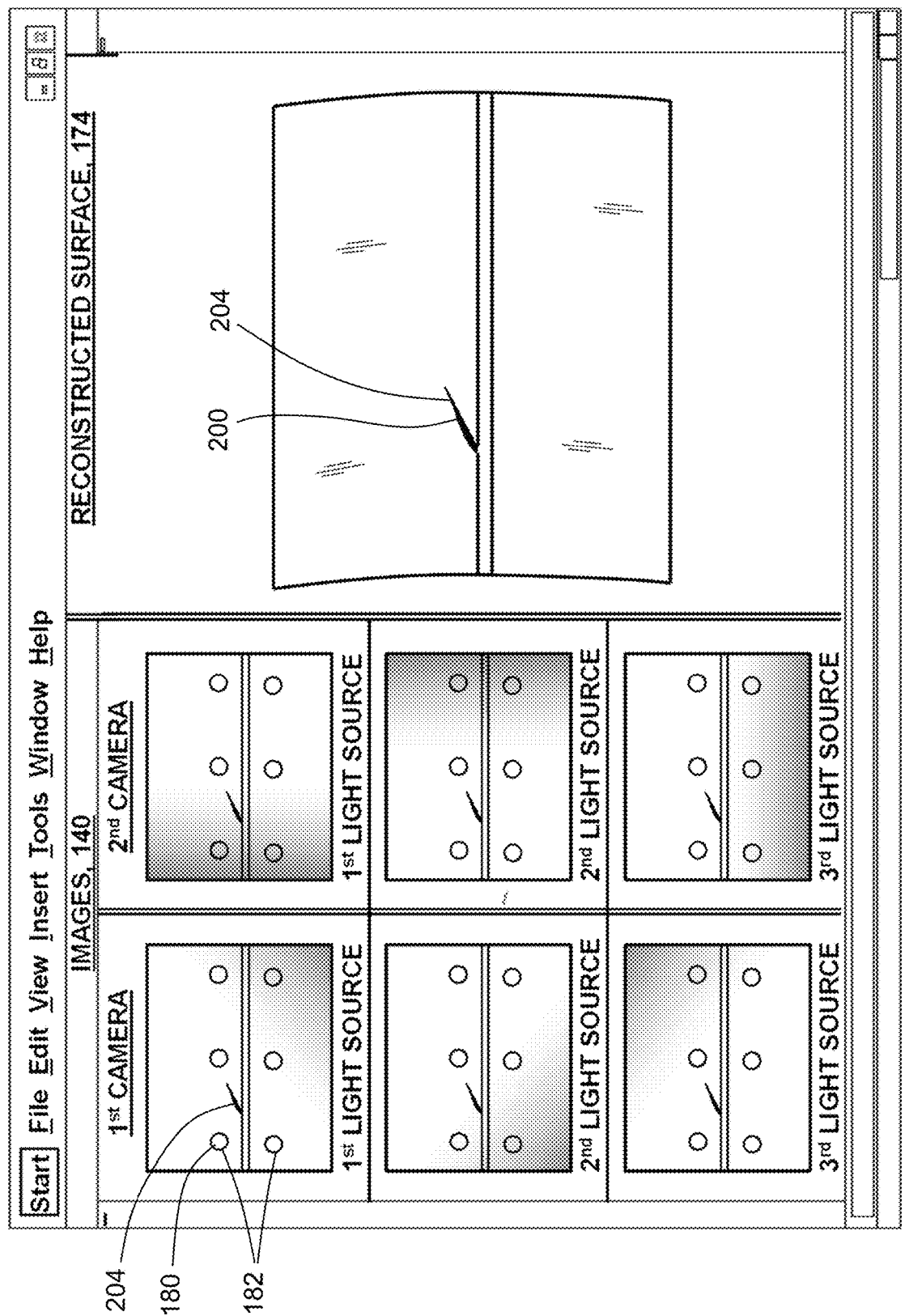
FIG. 23 shows an example of a display screen displaying a reconstructed surface in which the common structural features in the images have been masked out, and illustrating a defect in the reconstructed surface in the form of a gouge.
Figure 24:
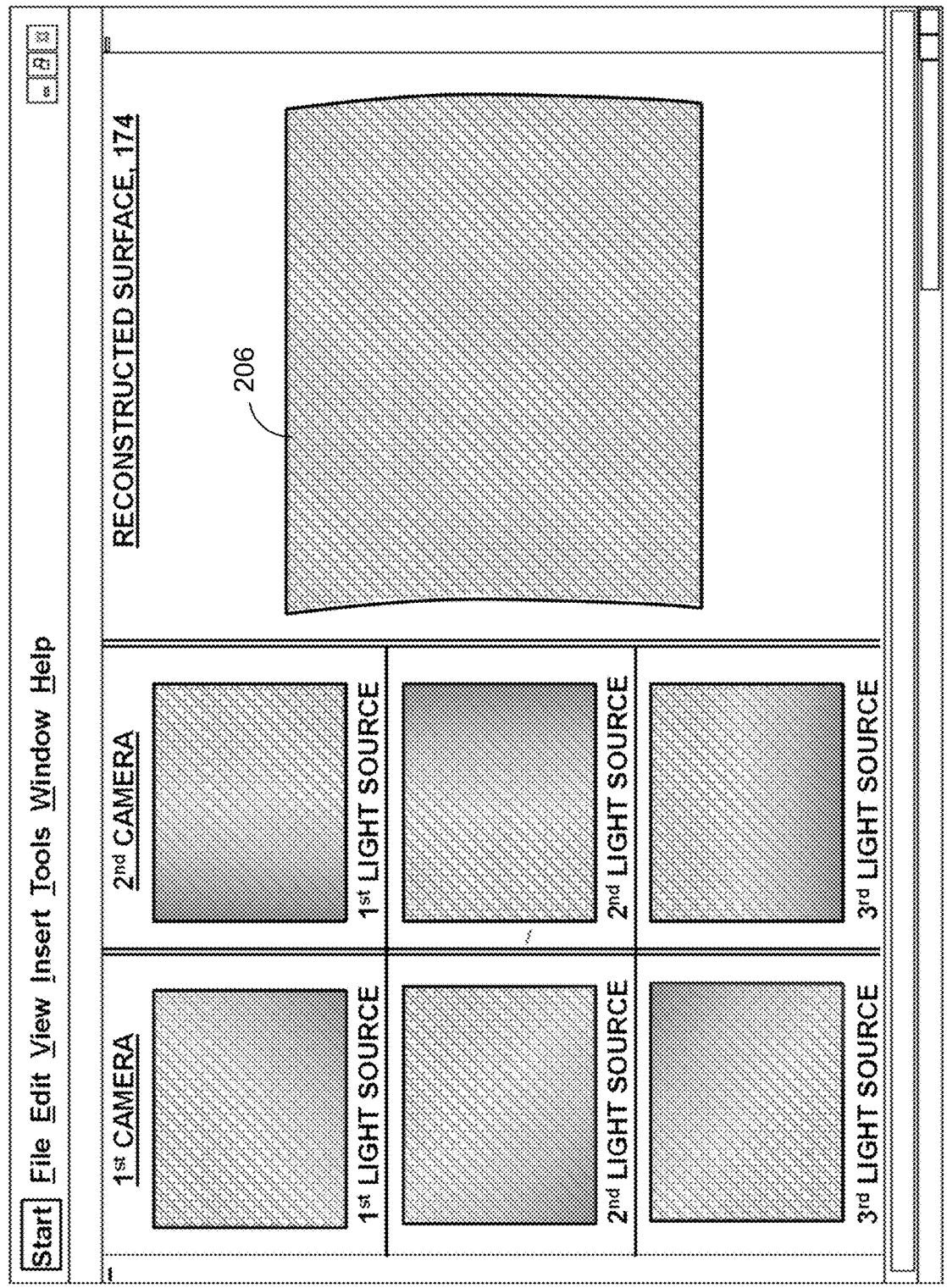
FIG. 24 shows an example of a display screen displaying a reconstructed surface showing texture of an inspected surface.

Referring now to the drawings which illustrate various examples of the disclosure, shown in FIG. 1 is an aircraft 302, which serves as an example of a structure 300 for which the presently disclosed inspection system 100 (FIG. 2) and method 500 (FIG. 25) is used for capturing the topography of a surface 310 (i.e., the inspected surface) and inspecting the surface 310 for defects 200 (FIGS. 21, 23, and 24). The aircraft 302 includes a fuselage 304, a pair of wings 314, and an empennage containing tail surfaces 316 such as horizontal elevator and a vertical fin. In the example shown, the fuselage 304 is constructed by separately manufacturing barrel sections 306, which are subsequently joined together at a corresponding plurality of section joins 184, as illustrated in FIG. 1.

Figure 2:
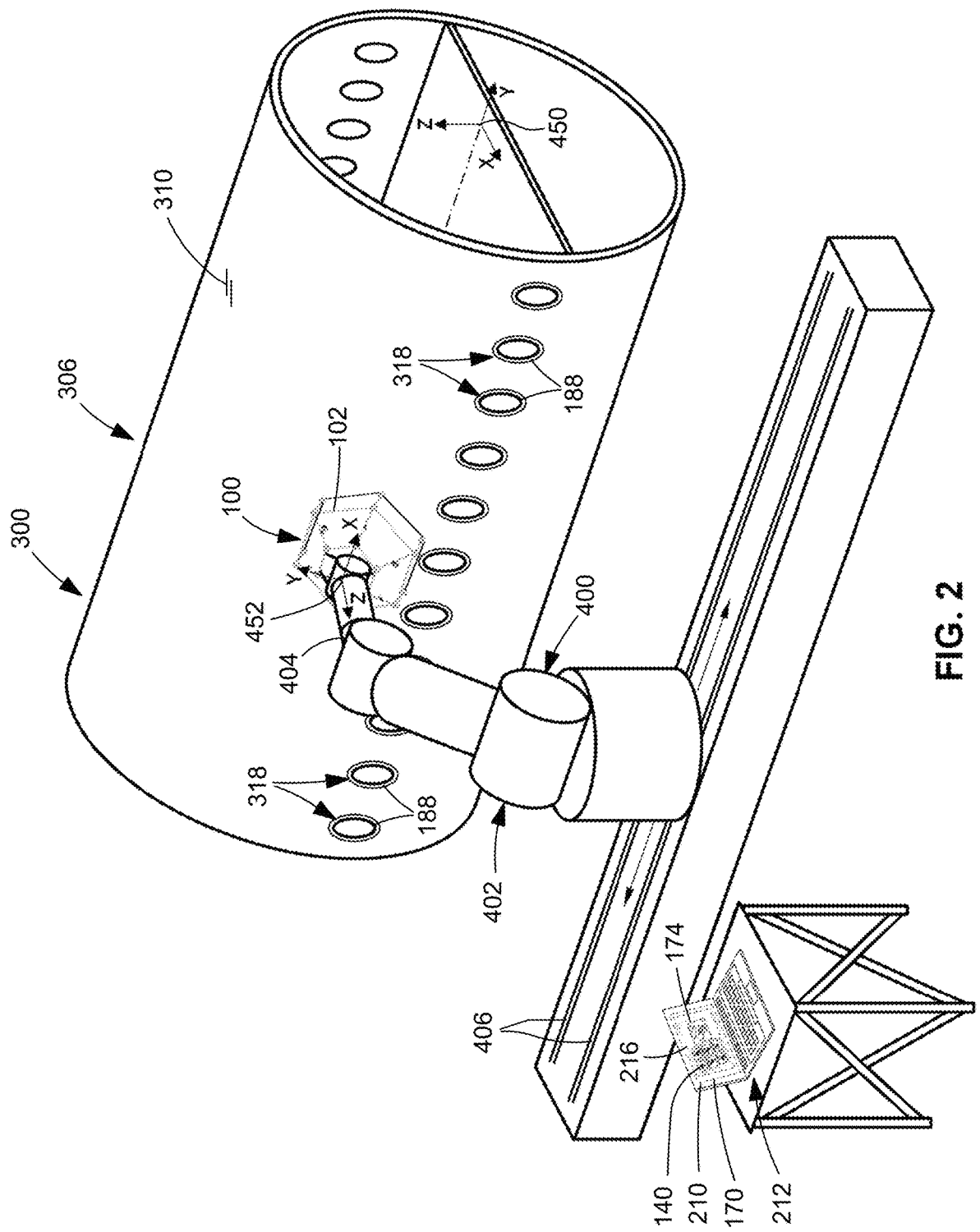
FIG. 2 shows an example of one of the barrel sections of the fuselage of the aircraft of FIG. 1, and illustrating a robotic device supporting the presently disclosed inspection system for inspecting surfaces of a structure, such as the barrel section.
Figure 3:
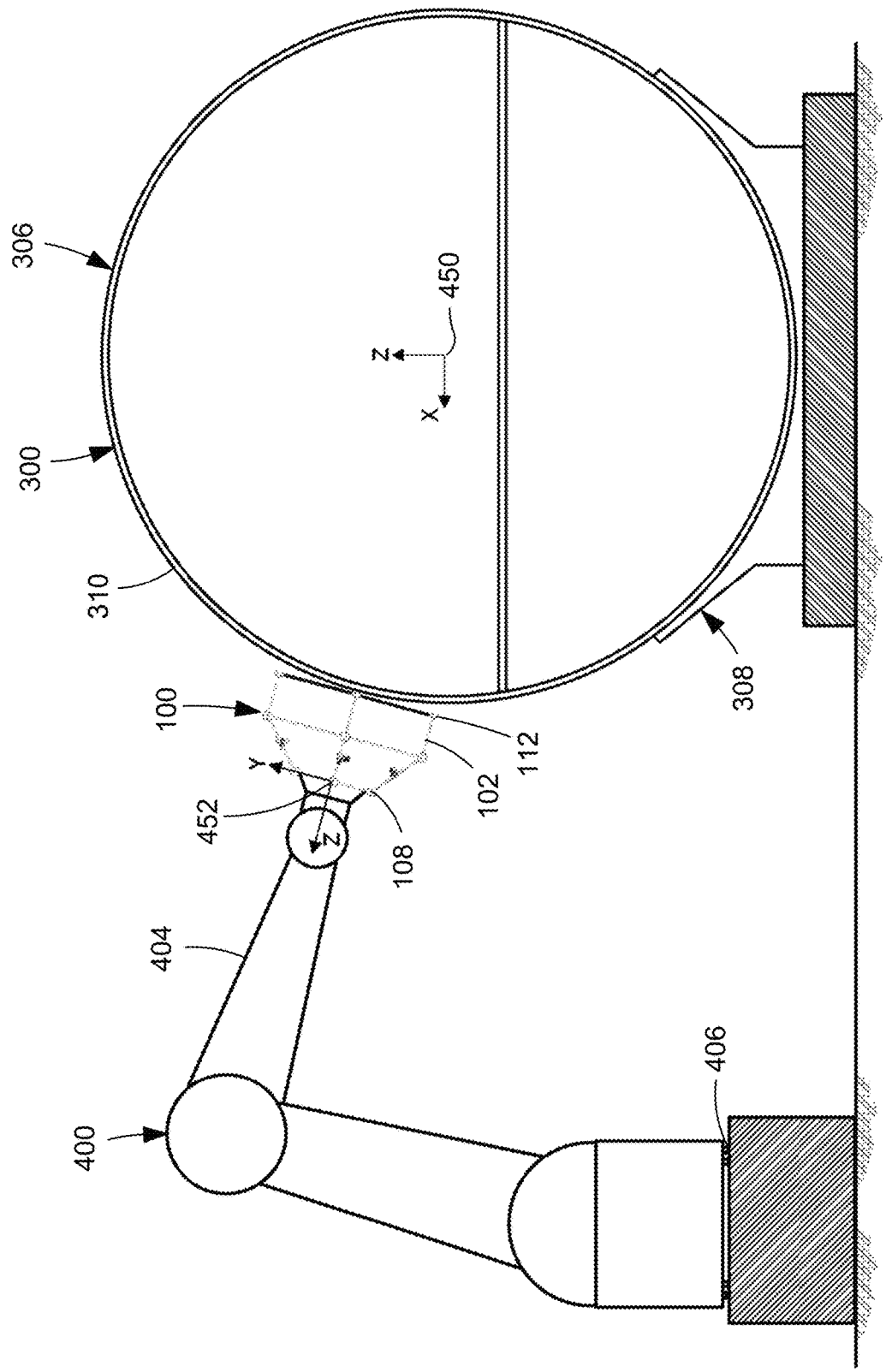
FIG. 3 is an end view of the barrel section of FIG. 2 during inspection via the inspection system.
Figure 4:
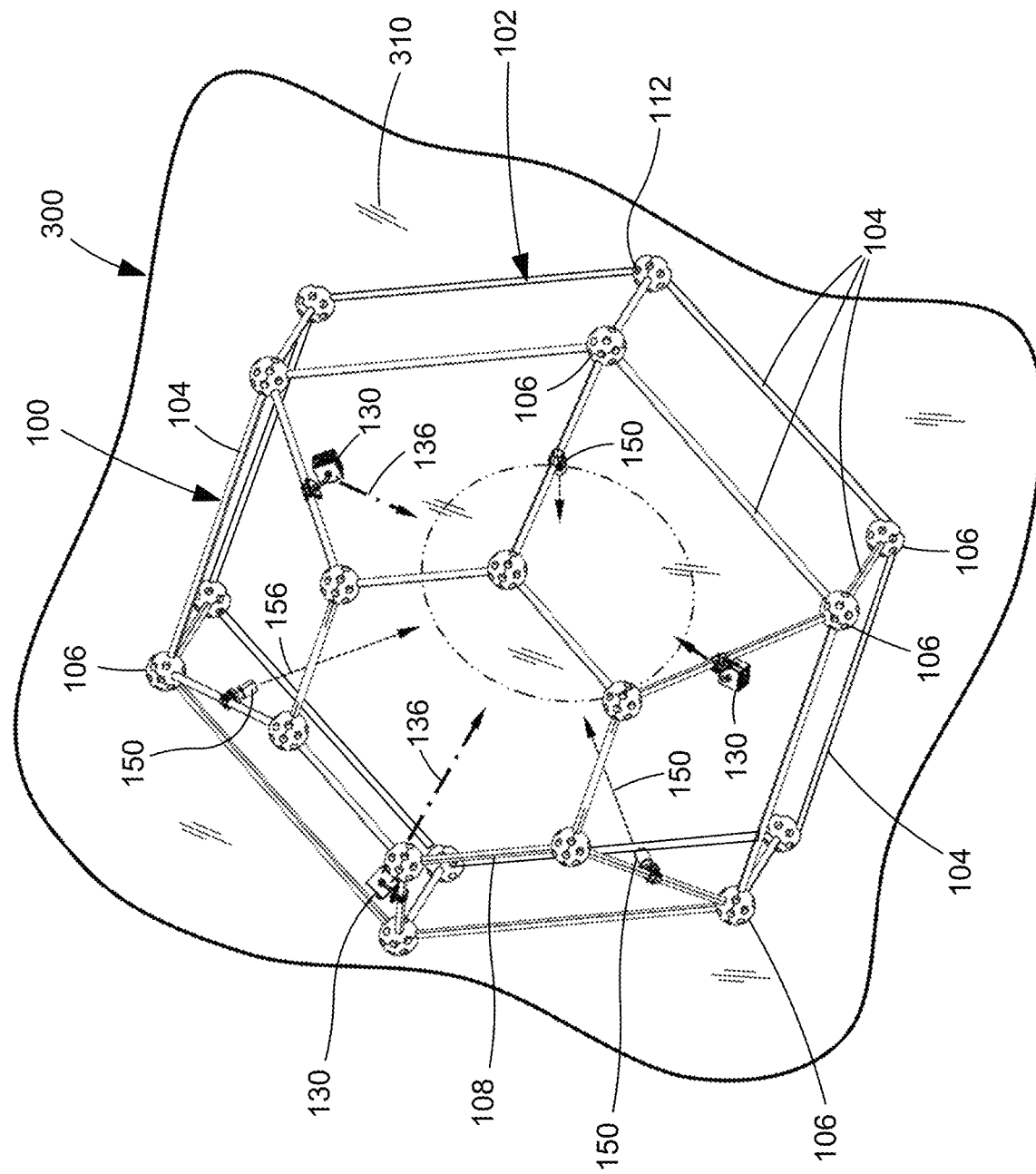
FIG. 4 is a magnified view of an example of the inspection system positioned against the surface of the barrel section, and illustrating the inspection system components including a rigid support frame, a plurality of light sources supported on the support frame, and a plurality of cameras supported on the support frame and configured to capture multiple images of a common region of the surface during sequential activation of the light sources.

Referring to FIGS. 2-4, the inspection system 100 includes a rigid support frame 102 (e.g., FIG. 4), at least three light sources 150 (FIG. 4) mounted at different locations on the support frame 102, at least two cameras 130

Figure 20:
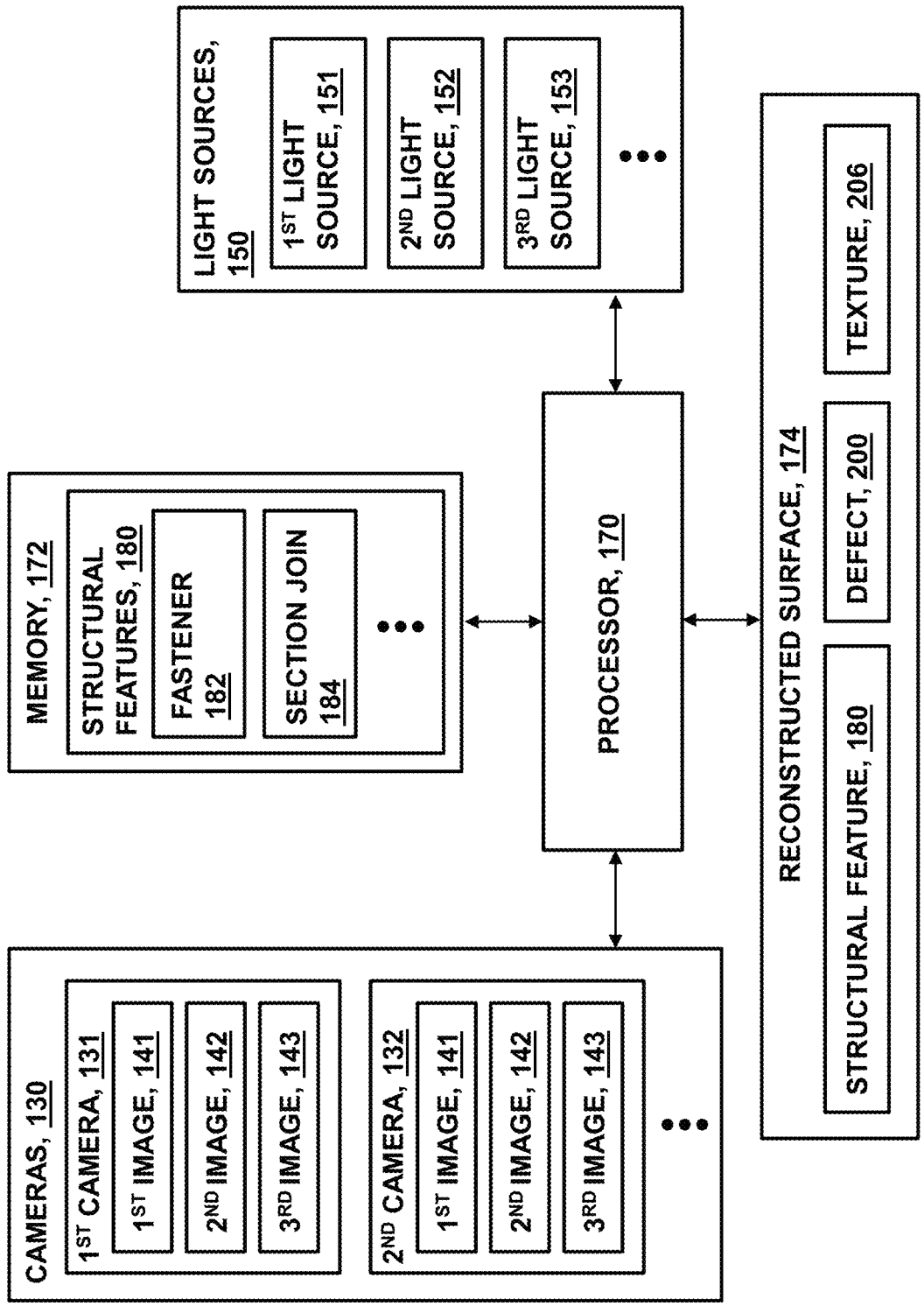
FIG. 20 is a block diagram of an example of the inspection system having a processor for controlling the operation of the cameras and the light sources and generating a reconstructed surface based on the images captured by the cameras.

(FIG. 4) also mounted at different locations on the support frame 102, and a processor 170 (FIGS. 2 and 20). As described in greater detail below, the processor 170 sequentially activates the light sources 150 in synchronization with the cameras 130 to capture multiple images 140 (e.g., FIG. 21) of the surface 310 from different viewing perspectives. The processor 170 uses photometric stereo techniques to perform surface reconstruction based on the images 140 to thereby form a reconstructed surface 174 (e.g., FIG. 21—a three-dimensional digital model) representing the topography of the surface 310 under inspection. In addition, the processor 170 analyzes the reconstructed surface 174 for imperfections and defects 200, as described in greater detail below.

Advantageously, multiple images 140 taken from different viewing perspectives allows for a relatively large field of view of the surface 310 under inspection. In addition, multiple images 140 reduce low-frequency shape distortion in the reconstructed surface 174, and allows for a high level of precision in detecting small surface features such as texture 206 (FIG. 24) and defects, including scratches 202 (e.g., FIG. 21), gouges 204 (e.g., FIG. 23), tool marks (not shown), and other types of discontinuities that are otherwise only detectable under specific lighting conditions or by feeling the surface 310 with fingers or fingernails. Advantageously, the inspection system 100 is a relatively small, lightweight, and low cost device that can be operated in a manner to quickly detect surface defects and imperfections that are otherwise undetectable using conventional inspection devices.

FIGS. 2-3 shows an example of the presently disclosed inspection system 100 positioned against one of the barrel sections 306 for capturing the surface topography and/or inspecting the exterior surfaces 310 of the barrel section 306. In the example shown, the barrel section 306 has a generally cylindrical shape having rows of passenger windows 318 on opposing sides of the barrel section 306. The windows 318 each have a window surround 188 providing local strength reinforcement around the window openings 116 in the barrel section 306. In some examples, the barrel section 306 is of metallic construction and the exterior surface 310 is defined by skin panels 186. However, in other examples, the barrel section 306 can be at least partially formed of composite material.

FIG. 3 shows the inspection system 100 implemented on a barrel section 306 (e.g., the structure 300) statically supported on an assembly fixture 308 within a manufacturing facility. In other examples not shown, the inspection system 100 can be implemented for capturing surface topography and/or inspecting the surfaces 310 of a structure 300 in a field operation. For example, the inspection system 100 can be implemented for capturing the surface topography and/or inspecting the surfaces 310 of the fuselage 304, wings 314, or other components of an in-service aircraft 302 at a maintenance facility during one of its regularly scheduled inspections. Although described in the context of a barrel section 306 of a fuselage 304, the presently disclosed inspection system 100 and method 500 can be implemented for inspecting any one of a variety different types of structures of any size, shape, configuration, and material composition, without limitation. Further in this regard, the presently disclosed inspection system 100 and method 500 can be implemented for inspecting planar surfaces and non-planar surfaces, including contoured surfaces and complexly curved surfaces.

Referring to FIGS. 2-14, shown are several examples of the inspection system 100, which includes the above-mentioned support frame 102. The support frame 102 has a top end 108 and a bottom end 112. The top end 108 of the support frame 102 is coupled to a movable platform 400. The bottom end 112 of the support frame 102 is configured to be positioned in close proximity to a surface 310 under inspection. The movable platform 400 is configured to move the inspection system 100 into any one or more locations along a surface 310 under inspection, and hold the inspection system 100 stationary at each location during activation of the light sources 150 and cameras 130 as described below.

In the example of FIGS. 2-3, the movable platform 400 is a robotic device 402 having a base that is movable along a robotic device track 406 to allow the inspection system 100 to be positioned at any location along the length of the barrel section 306 or other structure 300. Although shown as a robotic device 402, the movable platform 400 can be provided in any one of a variety of alternative configurations. For example, the movable platform 400 can be an overhead gantry (not shown) or any other type of movable platform 400 capable of positioning the inspection system 100 relative to a structure 300. In some examples, the movable platform 400 can sequentially position the inspection system 100 at different locations along a structure 300, and generate a reconstructed surface 174 (FIG. 21) at each location. In some examples, the processor 170 (FIG. 20) can stitch together the reconstructed surfaces 174 to form a three-dimensional representation of a substantial portion of the surface 310 of the structure 300.

In the example of FIG. 2, the inspection system 100 includes a graphic user interface (GUI 210) in the form of a laptop computer 212 containing the processor 170, which is communicatively coupled to the light sources 150 and the cameras 130. The laptop computer 212 has a display screen 216 configured to display the reconstructed surface 174 of the surface 310 under inspection. As described below, FIG. 21 shows an example of a display screen 216 of a GUI 210 displaying the images 140 captured by an inspection system 100 containing exactly two cameras 130 (e.g., a first camera 131 and a second camera 132) and exactly three light sources 150 (e.g., a first light source 151, a second light source 152, and a third light source 153), and also displaying the reconstructed surface 174. Also shown in the reconstructed surface 174 are surface imperfections or defects 200 detected by the processor 170. The images 140 and/or the reconstructed surface 174 can be displayed in real time or shortly (e.g., within seconds) after the images 140 have been captured and processed.

In FIGS. 4-14, the support frame 102 is configured as a truss structure comprised of a plurality of elongate beams 104 and a plurality of connecting elements 106. In the example shown, the beams 104 are lightweight tubes formed of high strength, high stiffness material such as polymer-reinforced fiber matrix material (e.g., carbon-fiber composite material). However, the beams 104 can be provided in configurations other than tubes, and can be formed of any suitable material including any metallic material (e.g., aluminum) and/or any non-metallic material such as non-fibrous polymeric material.

The connecting elements 106 are configured to interconnect the beams 104. In this regard, each of the connecting elements 106 has multiple openings 116, each of which is sized to snugly receive an end of a beam 104 as shown in FIG. 11. In the example shown, the connecting elements 106 are generally spherical in shape, and are formed of high strength polymeric material. However, the connecting elements 106 can be provided in any shape or size, and can be formed of any type of material (e.g., composite material, metallic material) or any combination of materials.

The connecting elements 106 at the bottom end 112 of the support frame 102 are referred to as frame feet 114. The frame feet 114 are interconnected by beams 104. In the example shown, the frame feet 114 are hemispherically shaped and have a generally flat bottom for placement against a surface 310 under inspection as shown in FIG. 7. However, in other examples, the frame feet 114 can have the same size, shape, and configuration as the remaining connecting elements 106 of the support frame 102. In some examples, the support frame 102 can include force sensors (not shown) on the frame feet 114 for providing force feedback to a movable platform 400 (e.g., a robotic device 402) for limiting the amount of force applied by the support frame 102 against the surface 310, thereby avoiding damage to the support frame 102 or the surface 310 under inspection.

The interconnection of the beams 104 via the connecting elements 106 results in a support frame 102 having a high level of rigidity. For example, the support frame 102 is configured to limit relative movement between any two points (e.g., any two connecting elements 106) on the support frame 102. Advantageously, providing the support frame 102 as a rigid structure allows the inspection system 100 to generate the reconstructed surface 174 with a high level of accuracy, which allows for a high level of precision in detecting small features in the surface 310 under inspection.

Figure 12:
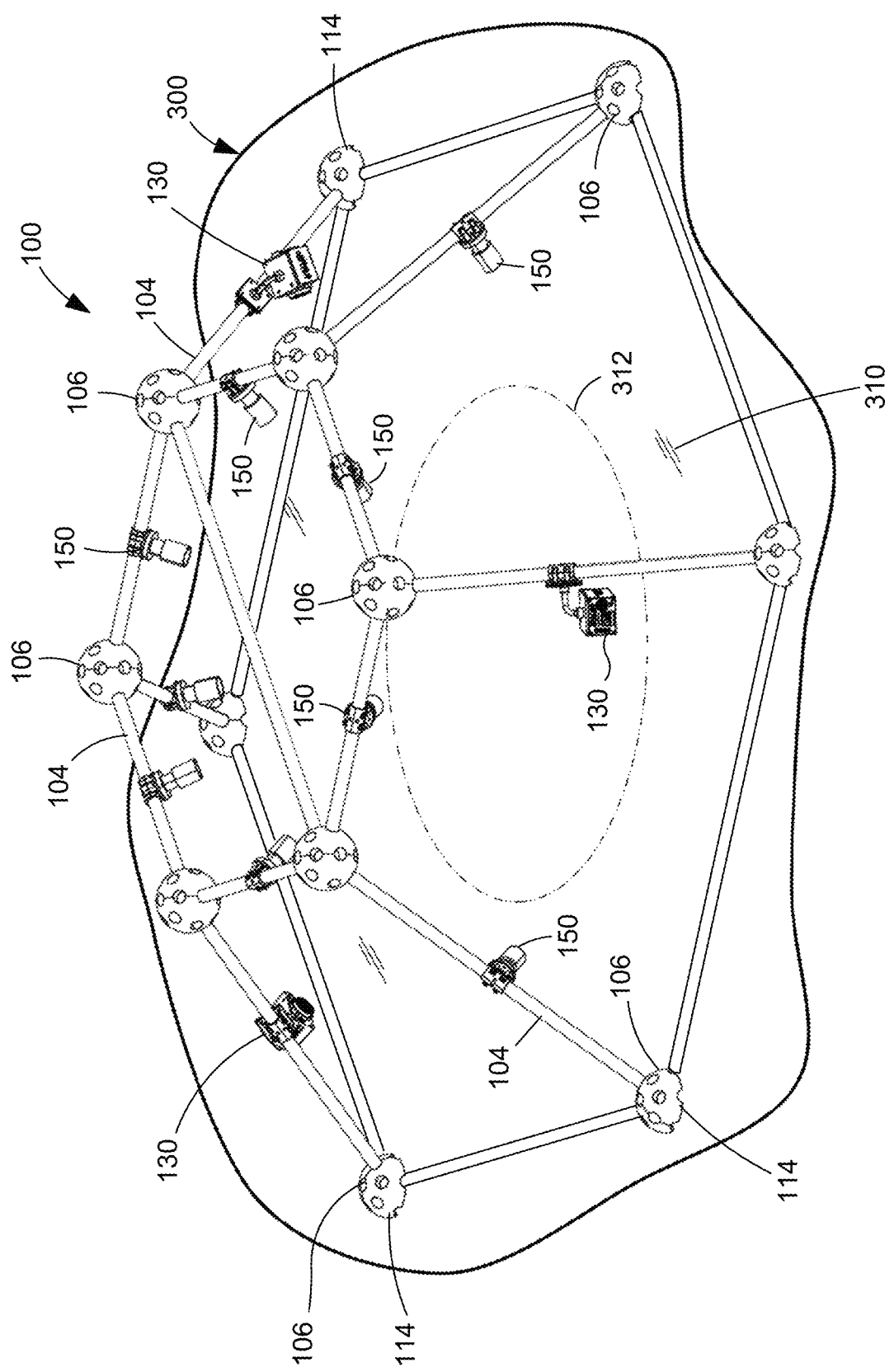
FIG. 12 shows an example of the inspection system in which the vertically oriented beams have been omitted from the support frame, and further illustrating a total of 9 light sources and a total of three cameras mounted on the support frame.
Figure 13:
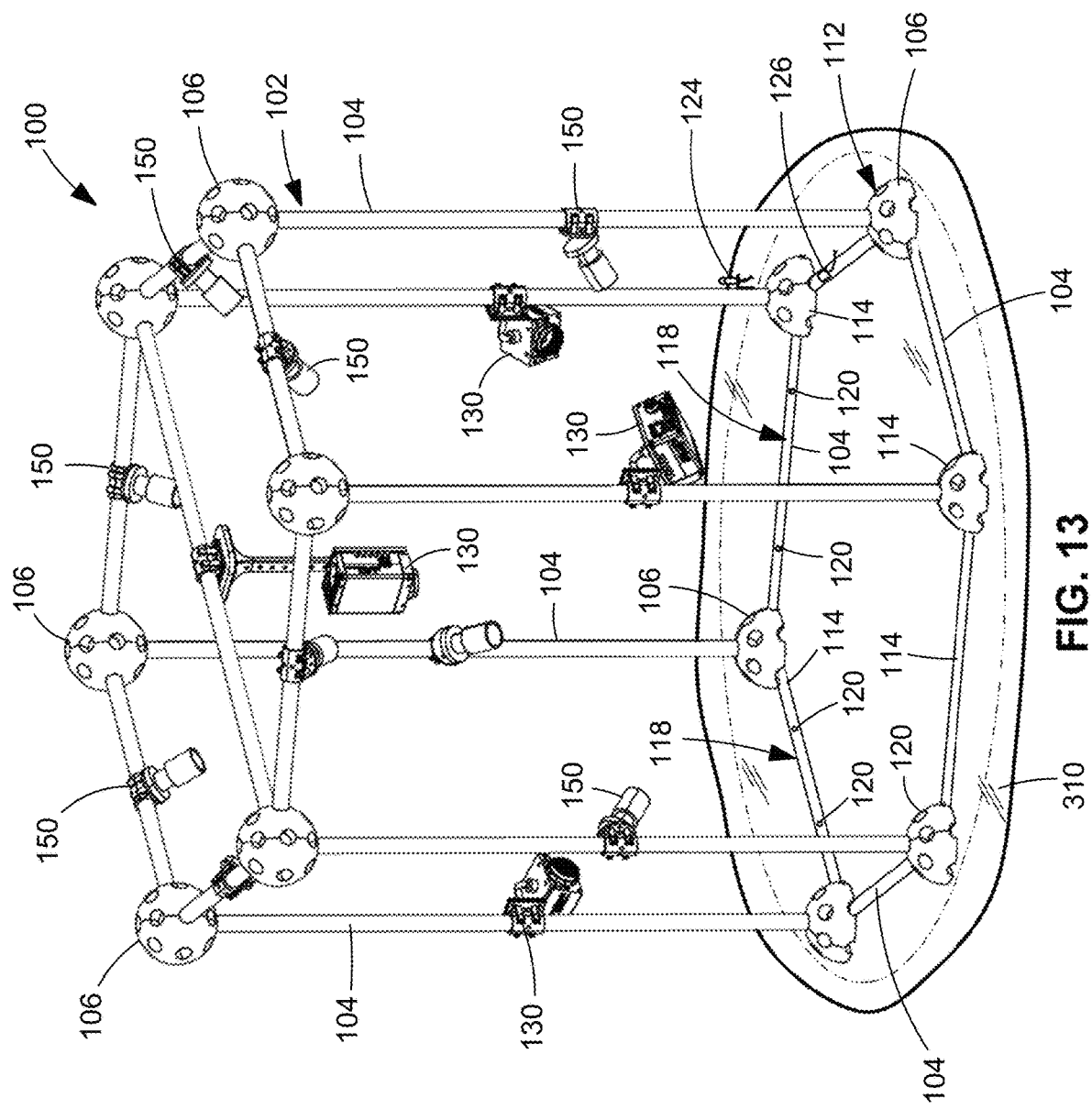
FIG. 13 shows an example of the inspection system in which the angled beams have been omitted from the support frame, and further illustrating reference targets mounted on a bottom end of the support frame.

In the example of FIG. 10, the truss structure of the support frame 102 is arranged in a dome-like shape having a hexagonal cross sectional shape when viewed from a top-down direction. However, the multiple openings 116 (FIG. 11) in the connecting elements 106 allow for a high level of customization in the size and shape of the support frame 102 to accommodate surfaces of a variety of different sizes (e.g., different radii of curvature) and/or shapes (e.g., planar, cylindrical, conical, doubly curved, etc.). For example, FIG. 12 shows an example of a support frame 102 in which the vertically oriented beams 104 of FIG. 7 are omitted, which reduces the overall height of the support frame 102, thereby allowing the cameras 130 and light sources 150 to be located closer to the surface 310 under inspection than allowed by the support frame 102 of FIG. 7. In contrast, FIG. 13 shows an example of a support frame 102 in which the angled beams 104 of FIG. 7 are omitted, and in which the vertically oriented beams 104 are relatively long, which increases the overall height of the support frame 102, thereby allowing the cameras 130 and lights sources 150 to be located farther from the surface 310 than allowed by the support frame 102 of FIG. 7. Locating the cameras further from the surface 310 allows for a larger field of view for the cameras 130, allowing a larger portion of a structure 300 to be inspected by the inspection system 100.

Although the support frame 102 is shown in the figures as a truss structure, the support frame 102 can be provided in any one of a variety of alternative configurations capable of supporting multiple cameras 130 and multiple light sources 150. For example, the support frame 102 can be provided as a rigid one-piece shell-like structure (not shown) preferably formed of lightweight material. Such a shell-like support frame can have a dome-like shape, and the cameras 130 and the light sources 150 can be attached to an interior side of the shell-like support frame. In one example, the shell-like support frame can be shaped similar to the background light shield 160 shown in FIGS. 15-16. However, a shell-like support frame can have any one of a variety of different shapes including rounded shapes, and is not limited to the shape shown in FIGS. 15-16. Advantageously, a shell-like support frame can serve dual functions of supporting the cameras 130 and light sources 150, and blocking background light.

FIGS. 5-6 show an example of the inspection system 100 which, due to its light weight, can be manually held in position against a surface 310 under inspection. In the example shown, the support frame 102 includes a pair of handles 110 extending from opposites sides of the top end 108 of the support frame 102 to thereby allow a technician to use both hands to grasp the handles 110 and hold the support frame 102 in position near or against a surface 310. As described in greater detail below, the example of FIGS. 5-6 includes a GUI 210 in the form of a tablet 214. The tablet 214 can be mounted to the handles 110 and/or to the top end 108 of the support frame 102, and is configured to display (e.g., in real time) images 140 captured by the cameras 130 and/or a reconstructed surface 174 based on the images 140 captured by the cameras 130.

As mentioned above, in each of the examples disclosed herein, the inspection system 100 includes at least three light sources 150 mounted at different locations on the support frame 102. FIG. 9 shows an example of a light source 150 clamped onto one of the beams 104 of the support frame 102. As described in greater detail below, the light sources 150 are activated (via the processor 170) one at a time to temporarily illuminate at least the common region 312 (FIGS. 4 and 7) of the surface 310 from different angles while the cameras 130 capture images 140 of the common region 312. The common region 312 can be described as the portion of the surface 310 that appears in every image 140 captured by the different cameras 130. In the example of FIGS. 4 and 7, the common region 312 is circumscribed by the support frame 102.

In the example of FIGS. 4-10, the inspection system 100 includes exactly three light sources 150 as mentioned above. However, in other examples, the inspection system 100 can include more than three light sources 150. For example, the inspection systems 100 of FIGS. 12 and 13 each have a total of 9 light sources 150 mounted at different locations on the support frame 102. In each of the examples of FIGS. 4-12, the light sources 150 are equiangularly spaced apart from each other when the inspection system 100 is viewed from a top-down perspective. However, in other examples not shown, the light sources 150 can be non-equiangularly spaced apart.

The light sources 150 can be omni-directional light sources (not shown), or the light sources 150 can be directional light sources 154 (FIG. 7) each configured to project a predominant portion of their light along a lighting direction 156 (FIG. 7), as shown in FIGS. 4 and 7. The lighting direction 156 of each directional light source 154 points generally toward the common region 312 of the surface 310 under inspection. In FIG. 7, the directional light sources 154 are mounted to the support frame 102 and/or are oriented in a manner such that the lighting direction 156 of each directional light source 154 forms an angle of incidence 158 of 15-75 degrees with the common region 312. To maximize the shadow effects on the surface 310 under inspection, the angle of incidence 158 of the lighting direction 156 of each directional light source 154 is preferably 15-45 degrees. In the example shown, the light sources 150 are linearly polarized spotlights configured to emit polarized light for reducing specular reflections off the surface 310 under inspection, thereby improving the accuracy of the reconstructed surface 174.

As mentioned above, the inspection system 100 includes at least two cameras 130. FIG. 8 shows an example of one of the cameras 130 clamped onto one of the beams 104. In FIG. 8, the cameras 130 are mounted at different locations on the support frame 102 for capturing images 140 of the surface 310 from different viewing perspectives. As mentioned above, multiple images 140 taken from different viewing perspectives corrects for low-frequency shape distortion in the reconstructed surface 174. In addition, multiple cameras 130 mounted at different locations allows for a relatively large field of view, which reduces the total amount of time required to inspect a large surface 310.

Although a minimum of two cameras 130 are required, the inspection system 100 can include more than two cameras 130. For example, each of the inspection systems 100 of FIGS. 4-12 include exactly three cameras 130. In another example, the inspection system 100 of FIG. 13 has exactly four cameras 130, including three cameras 130 mounted on the angled beams 104 of the support frame 102, and one centrally-located overhead camera 130 (e.g., a panoramic camera) mounted at the top end 108 of the support frame 102. Regardless of the number of cameras 130 in an inspection system 100, each camera 130 has a viewing direction 136 (FIG. 7), and all the cameras 130 are mounted on the support frame 102 in a manner such that their respective viewing directions 136 point generally toward the common region 312 of the surface 310. In some examples, at least some of the cameras 130 can be mounted such that when the inspection system 100 is placed over or against a surface 310 under inspection, the viewing direction 136 of at least some of the cameras 130 is locally non-normal to the surface 310, which may enhance the ability for shadows generated by discontinuities in the surface 310 to be captured in the images 140. In the examples shown in the figures, the cameras 130 are equiangularly spaced apart from each other when the inspection system 100 is viewed from a top-down perspective. However, in other examples not shown, the cameras 130 can be non-equiangularly spaced apart.

In some examples, the inspection system 100 includes reference targets 120 mounted respectively at different locations on the support frame 102. The reference targets 120 are used for scaling verification of the images 140 and/or to compute the camera positions. For examples in which the inspection system 100 contains reference targets 120, each camera 130 is configured to capture images 140 that contain the reference targets 120 in addition to capturing the common region 312 of the surface 310 under inspection. In order to determine the positions of the cameras 130, the common region 312 must encompass a sufficient number of reference targets 120. More specifically, the cameras 130 of the inspection system 100 are configured and oriented such that there are a minimum of three common reference targets 120 visible in each camera view, plus at least one more camera view that contains those same three reference targets 120. For example, in an inspection system 100 have exactly two cameras 130 including a first camera 131 and a second camera 132, each image 140 captured by the first camera 131 contains at least three reference targets 120, and each image 140 captured by the second camera 132 also contains at least those same three reference targets 120. Increasing the number of cameras 130 of an inspection system 100 will increase the accuracy of the reconstructed surface 174 which, in turn, will allow for an increase in the precision with which the processor 170 is capable of detecting surface features, such as defects 200 in a surface 310. As may be appreciated, an inspection system 100 can have three or more cameras 130 which will correspondingly increase the accuracy of the reconstructed surface 174.

FIGS. 13-14 show reference targets 120 installed on at least two of the beams 104 interconnecting the frame feet 114 at the bottom end 112 of the support frame 102. The two reference targets 120 on each beam 104 are spaced apart at a known scaling distance 119 which allows such beams 104 to function as scale bars 118. The scaling distance 119 between the reference targets 120 on each scale bar 118 is separately measured by a highly accurate measurement instrument (not shown). The support frame 102 of an inspection system 100 preferably includes at least one scale bar 118 oriented substantially parallel to (e.g., within 30 degrees) the x axis of the local coordinate system 442, and at least one scale bar 118 oriented substantially parallel to (e.g., within 30 degrees) the y axis of the local coordinate system 442, to facilitate scaling verification of the images 140 respectively in the x and y directions. Although the support frame 102 in FIG. 13 has scale bars 118 located at the bottom end 112, any one or more of the beams 104 of a support frame 102 can include reference targets 120 that allow the beams 104 to function as scale bars 118.

The processor 170 uses photogrammetry techniques for scaling verification of the images 140 based on the scaling distance 119 between the reference targets 120 on the scale bars when 18. In addition, as mentioned above, the processor 170 uses photogrammetry techniques to compute the camera positions and/or calculate the position and orientation of the inspection system 100 (e.g., the local coordinate system 442—FIG. 2) relative to the global coordinate system 440 (FIG. 2) of the structure 300. Scaling verification of the images 140 and/or computing of the camera positions is performed as a separate step prior to generating the reconstructed surface 174. During the inspection of a surface 310, scaling verification and/or computing camera positions can occur in the background after all images 140 have been captured.

Referring briefly to FIGS. 15-16, the reference targets 120 are shown having a circular shape. However, the reference targets 120 can be provided in any one of a variety of shapes such as a square shape or other shapes. FIG. 16 shows an example of a coded target 122. Each coded target 122 of an inspection system 100 has a unique pattern or code (e.g., a coded ring pattern) that is recognized by the processor 170 when processing the images 140 for calibrating the cameras 130 and/or for determining the camera positions and orientations. In this regard, the coded targets 122 contribute toward generating a highly accurate reconstructed surface 174, and allow for precise detection and characterization of defects 200 in a surface 310.

In some examples, an inspection system 100 can include one or more temperature sensors 124 and/or thermocouples 126 for measuring the temperature of the support frame 102 and/or the temperature of the ambient air. For example, FIG. 14 shows an example of a support frame 102 having a temperature sensor 124 mounted on one of the beams 104 and configured to measure ambient air temperature. Also shown is a thermocouple 126 mounted on one of the beams 104 for measuring the temperature of the support frame 102. Measurements from the temperature sensor 124 and the thermocouple 126 are received by the processor 170, which uses the temperature measurements to compensate for thermal expansion or contraction of the support frame 102 during the calibration process and/or when processing the images 140 for surface reconstruction.

The reference targets 120 can be made of relatively thin flexible material such as vinyl sheeting having adhesive on one side for adhering the reference targets 120 to the frame feet 114. However, the reference targets 120 can be made of any material, and can located on any one of a variety of alternative locations on the support frame 102, and are not limited to being installed on the frame feet 114.

FIG. 13 shows the common region 312 having an enlarged size that encompasses all of the reference targets 120 installed on the support frame 102. As mentioned above, the processor 170 is configured to analyze the images 140 containing the reference targets 120, and determine a scaling factor of the images 140 based on the reference targets 120. Alternatively or additionally, the processor 170 is configured to use the reference targets 120 to determine the three-dimensional locations of the cameras 130 relative to each other and relative to the surface 310. In addition, the processor 170 can use the reference targets 120 and recognized structural features 180 (FIG. 20) to determine the position and orientation of the local reference coordinate system 442 of the inspection system 100 (FIGS. 2-3) relative to the global reference coordinate system 440 of the structure 300 (FIGS. 2-3).

Referring to FIGS. 17-18, shown is an example of the inspection system 100 having a background light shield 160 for blocking out background light (not shown) to avoid any adverse impacts on the quality of the images 140 generated by the cameras 130, and which could affect the accuracy of the reconstructed surface 174. Background light can be described as light from external and/or distant sources, and can include sunlight, shop lights in a factory, or any other external sources located outside of the support frame 102. The background light shield 160 is preferably configured to prevent most, if not all, of the background light from entering the interior of the support frame 102 and/or impinging on the common region 312 of the surface 310 under inspection. The background light shield 160 can be formed of either rigid or flexible material, and can be removably attached to or mounted over the support frame 102 using any one of a variety of techniques such as mechanical fasteners (not shown), Velcro™ (not shown), adhesive, or any other attachment method. For example, the background light shield 160 can be a fabric such as black polyester fabric attached to (e.g., adhered to) the beams 104 and/or the connecting elements 106 of the support frame 102.

As an alternative to or in addition to a background light shield 160, the inspection system 100 can include a lens filter 134 mounted on the lens of each camera 130, as shown in FIG. 19. The lens filter 134 can be configured to filter out one or more wavelengths of background light to thereby avoid any adverse impacts of the background light on the quality of the images 140. In some examples, the light sources 150 can be configured to emit light in at least one wavelength that is different than the wavelengths filtered out by the lens filter 134, such that the common region 312 is sufficiently illuminated in a manner allowing the cameras 130 to capture high-quality images 140.

Referring to FIG. 20, shown is a block diagram of an example of the inspection system 100 containing at least three light sources 150 (e.g., a first light source 151, a second light source 152, a third light source 153, etc.), at least two cameras 130 (e.g., a first camera 131, a second camera 132, etc.), a processor 170, and a memory 172. The processor 170 and memory 172 can be part of a computing device that controls the light sources 150 and the cameras 130. For example, the processor 170 and memory 172 can be integrated into a desktop computer (not shown), a laptop computer 212 (e.g., FIG. 2), a tablet 214 (e.g., FIG. 5), or any other type of computing device. The above-mentioned GUI 210 can also be integrated into the computing device that contains the processor 170 and memory 172.

The processor 170 is configured to control and sequence the light sources 150 in synchronization with the cameras 130 to capture multiple images 140 of a surface 310 under inspection. The processor 170 receives the images 140, which can be stored in the memory 172. In the example shown, the images 140 include a first image 141, a second image 142, and a third image 143 captured by the first camera 131, and a first image 141, a second image 142, and a third image 143 captured by the second camera 132. Alternatively or additionally, the memory 172 can store a plurality of common structural features 180 that make up the structure 300 under inspection. Common structural features 180 can include fasteners 182 (FIG. 22), section joins 184 (FIG. 1), window surrounds 188 (FIG. 2), and any one of a variety of other types of structural features 180 that are common components of the structure 300. As described in greater details below, the processor 170 is configured to recognize common structural features 180 in the images 140 of the surface 310 under inspection, and mask out such structural features 180, which can otherwise negatively impact the accuracy of the reconstructed surface 174.

The processor 170 is also configured to analyze the reconstructed surface 174 for structural features 180, defects 200, and/or texture 206. For example, the processor 170 can use known defect detection techniques such as robust surface fitting or normal vector tracking to analyze for surface defects 200 such as scratches 202 (e.g., FIG. 21), gouges 204 (e.g., FIG. 23) and other types of defects 200. Advantageously, the inspection system 100 allows for detection of small surface defects 200 and imperfections that are otherwise undetectable using conventional inspection devices, as mentioned above. The processor 170 can analyze detected defects 200 and provide characterizations (e.g., measurements) such as the size (e.g., defect depth of 0.010 inch) and type of defect (e.g., scratch, gouge, etc.).

The processor 170 can also analyze a reconstructed surface 174 for texture 206 (e.g., FIG. 24) using known surface fitting methods or by generating a profile line (not shown) directly on the reconstructed surface 174 and subsequently measuring peak-to-valley plots along the profile line. By analyzing the texture 206 of a surface 310, the inspection system 100 advantageously provides a means to better understand the characteristics (e.g., average surface roughness) of a base surface and any surface coatings (e.g., paint) subsequently applied to the base surface. Understanding the characteristics of the base surface and/or surface coatings can help determine the types of defects 200 that can be found when inspecting a surface 310. For example, defects 200 that have a feature size smaller than the texture or surface roughness may be undetectable.

Referring still to FIG. 20, as mentioned above, the processor 170 is configured to control and sequence the light sources 150 in synchronization with the cameras 130, as mentioned above. More specifically, while the inspection system 100 is held stationary in position over a surface, the processor 170 is configured to temporarily activate the light sources 150 one at a time and cause all the cameras 130 to capture a respective plurality of images 140 of a common region 312 of the surface 310 each time a light sources 150 is activated. The cycle is repeated until each light source 150 has been activated.

For example, in an inspection system 100 having exactly three light sources 150 and exactly two cameras 130, the processor 170 activates (i.e., turns on) the first light source 151, commands the first camera 131 and the second camera 132 to capture images 140 of the common region 312 while the first light source 151 is activated, and then deactivates (i.e., turns off) the first light source 151. After capturing images 140 with the first camera 131 and second camera 132 with only the first light source 151 activated, the processor 170 then activates the second light source 152 and commands the first camera 131 and the second camera 132 to capture images 140 of the common region 312 with only the second light source 152 activated, after which the second light source 152 is deactivated. The cycle is repeated for the third light source 153. The amount of time that each light source is 150 is activated (e.g., is emitting light) can be relatively short, such as less than one second. Depending on the total number of cameras 130, the total amount of time to cycle through all of the light sources 150 while capturing images 140 can also be relatively short, such as on the order of seconds.

The processor 170 receives the images 140, which are combined and processed by camera 130, and indexed by light source 150. For example, in an inspection system 100 having exactly two cameras 130 (e.g., a first camera 131 and a second camera 132) and exactly three light sources 150 (e.g., a first light source 151, a second light source 152, and a third light source 153), the first camera 131 combines its first, second, and third images 141, 142, 143, and the second camera 132 combines its first, second, and third images 141, 142, 143. The processor 170 then generates digital surfaces based on each camera view. For example, the processor 170 uses a photometric algorithm to generate a first digital surface (not shown) based on the first, second, and third images 141, 142, 143 captured by the first camera 131, and then generates a second digital surface (not shown) based on the first, second, and third images 141, 142, 143 captured by the second camera 132. The processor 170 then uses the camera positions to align the first and second digital surfaces and then generates a best fit surface (i.e., the reconstructed surface 174) after removing outliers and noise. The above-mentioned process is one example for processing multiple images 140 having multiple viewing perspective to generate a reconstructed surface 174. Any one of a variety of other optimization methods and approaches can be implemented to perform multi-view surface reconstruction to result in the reconstructed surface 174.

Advantageously in the presently disclosed inspection system 100, the use of multiple cameras 130 to capture images 140 of a surface 310 from different viewing perspectives allows the inspection system 100 to reduce low-frequency shape distortion that occurs due to nonuniform reflectance of light across the surface 310. Photometric stereo algorithms assume that light sources are distant and that the light intensity across a surface is therefore uniform. However, in many practical applications, the light sources are not very distant. For example, if a light source is illuminating the surface of a flat plate (not shown), the intensity of light across the surface will be nonuniform even though the surface is perfectly flat. Advantageously in the presently disclosed inspection system 100, by having two or more viewing directions 136 (i.e., multiple cameras 130), nonuniform reflectance is averaged out to minimize the impact of shape distortion.

Alternatively or additionally, nonuniform reflectance can be calibrated to minimize the impact of shape distortion in the reconstructed surface 174. In this regard, prior to its use, the inspection system (e.g., the cameras) undergoes a calibration process in which the cameras 130 capture images of known and certified artifacts (not shown) to ensure that the inspection system 100 (e.g., the cameras 130) is operating properly. Examples of certified artifacts include gauge blocks (e.g., a prism of known dimensions), a flat plate etched with a grid of known dimensions, calibration targets, and other known artifacts that are used for camera calibration. As part of the calibration process, adjustments for camera intrinsic and extrinsic parameters are made in the software upon which the processor 170 operates. The calibration process is performed via the GUI and can be repeated periodically during the life of the inspection system 100 to maintain or improve the accuracy and reliability of surface reconstruction.

Advantageously, by minimizing shape distortion due to multiple cameras 130 of the inspection system 100, changes in surface curvature and material are readily highlighted, revealing raised and/or recessed defects 200 such as scratches 202, gouges 204, and tool marks. Furthermore, the texture 206 of a surface 310 and any local deviations, abnormalities, and/or flaws in surface coatings (e.g., paint) are readily highlighted.

FIG. 21 shows an example of a display screen 216 of a GUI 210 displaying the images 140 captured by an inspection system 100 having exactly three light sources 150 and exactly two cameras 130. The display screen 216 shows three images 140 captured by the first camera 131 from its unique viewing direction 136 under three different lighting conditions generated respectively by the three light sources 150. In addition, the display screen 216 shows three images 140 captured by the second camera 132 from its unique viewing direction 136 under the same three lighting conditions. Each image 140 contains surface defects 200 in the form of scratches 202. Due to differences in the lighting directions 156 under which each image 140 is captured, there are variations in the extent to which some of the scratches 202 appear in the images 140. For example, only one portion of a scratch 202 may appear in one image 140, while another portion of the same scratch 202 may appear in one or more of the other images 140. The processor 170 combines the images 140 in a manner such that the reconstructed surface 174 represents the topography of the common region 312 of the surface 310 with a high level of accuracy. In addition, the processor 170 detects small surface discontinuities such as scratches 202 with a high level of precision. The right-hand side of the display screen 216 of FIG. 21 shows the reconstructed surface 174 containing each of the scratches 202 in their entirety.

As mentioned above, the processor 170 is configured to analyze the reconstructed surface 174 for structural features 180, defects 200, and/or texture 206. As mentioned above, the processor 170 initially recognizes any common structural features 180 that appear in the images 140 of the surface 310 under inspection. For example, the processor 170 recognizes common structural features 180 by comparing the images 140 to the structural features 180 stored in the memory 172. If an image 140 contains common structural features 180, the processor 170 masks out such structural features 180, which can otherwise negatively impact the reliability and accuracy of the surface 310 reconstruction process due to reflections, shadows, and/or other effects generated by the structural features 180.

Figure 22:
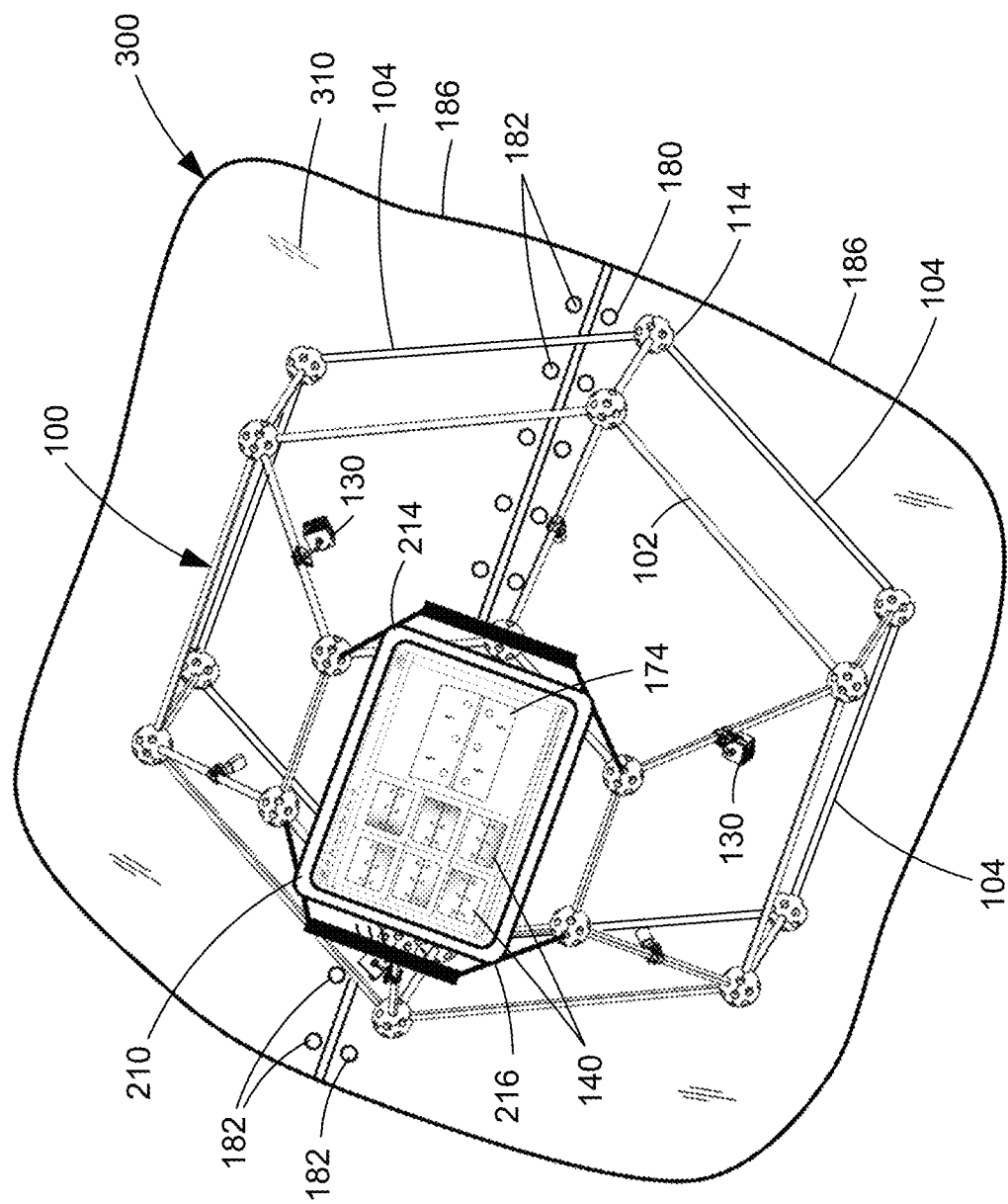
FIG. 22 shows an example of the inspection system positioned against a surface of a structure having common structural features in the form of fasteners.

To illustrate the masking of common structural feature 180, FIG. 22 shows an example of an inspection system 100 configured to be manually held in position against a surface 310 of a structure 300 having common structural features 180 in the form of fasteners 182 securing skin panels 186 to underlying structural components (not shown). FIG. 23 shows a display screen 216 displaying multiple images 140 of the inspected surface 310 of FIG. 22. Each image 140 contains a surface 310 defect 200 in the form of a gouge 204 in one of the skin panels 186. On the right-hand side of the display screen 216 is a reconstructed surface 174 generated from the images 140. The processor 170 has masked out the common structural features 180 (i.e., the fasteners 182) which improves the accuracy of the reconstructed surface 174, and which also has the effect of highlighting the gouge 204 in the skin panel 186. The gouge 204 is detected using a suitable defect detection technique such as robust surface fitting or normal vector tracking as described below, or another defect detection technique. The processor 170 can also plot and/or highlight the location of defects 200 in the surface 310.

FIG. 24 shows an example of a display screen 216 of a GUI 210 displaying images 140 captured by an inspection system 100 having exactly three light sources 150 and exactly two cameras 130. Similar to the arrangement in above-described FIGS. 21 and 23, the display screen 216 in FIG. 24 shows three images 140 captured by the first camera 131 from its unique viewing direction 136 under three different lighting conditions from the three light sources 150, and three images 140 captured by the second camera 132 from its unique viewing direction 136 under the same three lighting conditions. Due to differences in the lighting directions 156, there are variations in the extent to which the texture 206 appears in the images 140. The processor 170 combines the images 140 in a manner such that the reconstructed surface 174 accurately represents the texture 206 of the entirety of the common region 312 of the surface 310. As mentioned above, the processor 170 can also analyze the reconstructed surface 174 using known surface fitting methods or by generating a profile line (not shown) on the reconstructed surface and measuring the peak-to-valley distance at different points along the profile line to thereby characterize the texture 206 (e.g., in terms of surface roughness).

Figure 25:
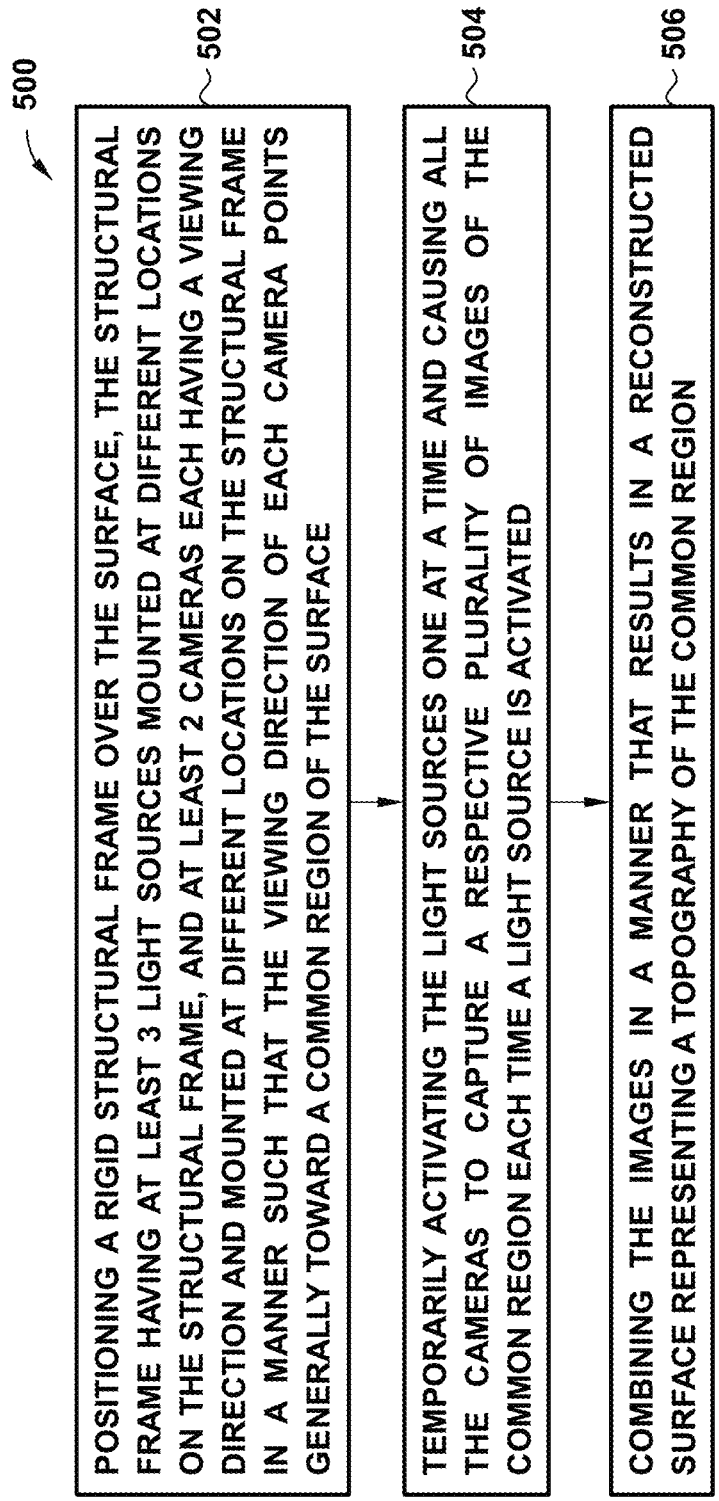
FIG. 25 is a flowchart of operations included in a method of capturing a topography of a surface under inspection.
Figure 26:
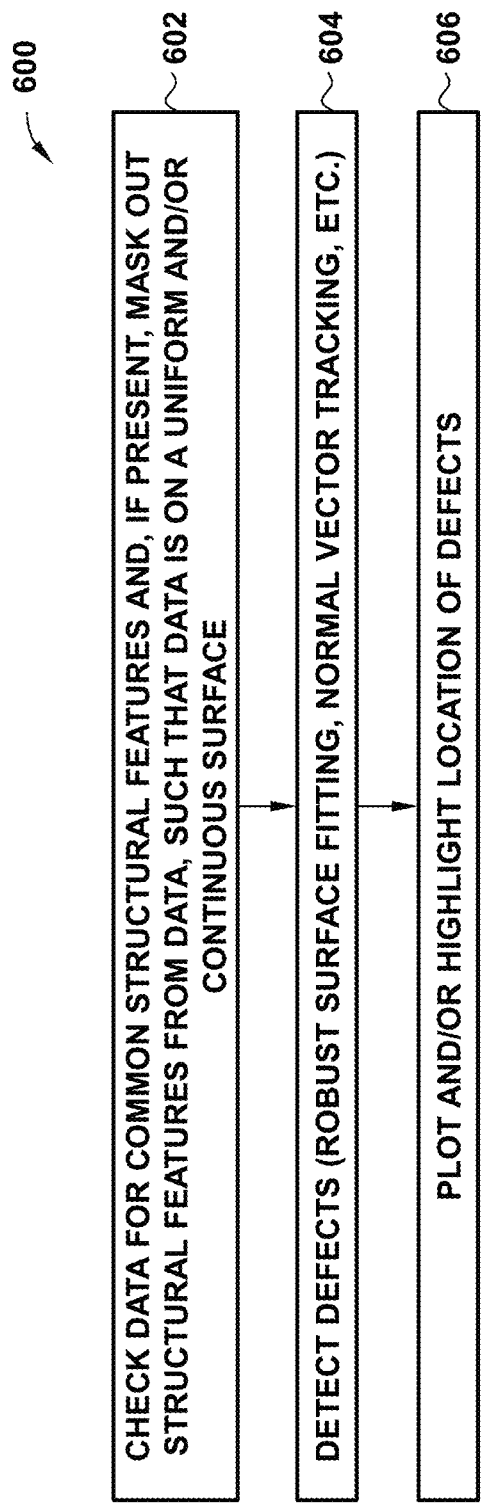
FIG. 26 is a flowchart of operations included in a method of detecting defects in a reconstructed surface generated by the presently disclosed inspection system.

Referring to FIG. 25, shown is a flowchart of operations included in a method 500 of capturing the topography of a surface 310 under inspection. As described in greater detail below, the topography is represented by a reconstructed surface 174 (e.g., a three-dimensional digital model). The method 500 is performed using the above-described inspection system 100 which includes a rigid support frame 102, at least three light sources 150, at least two cameras 130, and a processor 170.

The method 500 includes calibrating the inspection system 100 prior to its initial use. For example, the method 500 includes calibrating the cameras 130 using certified artifacts (not shown) to determine the parameters (e.g., intrinsic and/or extrinsic) of the cameras 130 and to confirm the that inspection system 100 is operating properly. Examples of certified artifacts include gauge blocks, flat plates etched with grids, calibration targets, and other known artifacts. Using known techniques, the camera parameters are determined, and adjustments are made to the algorithms to account for the camera parameters.

The calibration process also includes using photogrammetry techniques to perform scaling verification of the images 140 and/or for computing the three-dimensional positions of the cameras 130. Referring to FIGS. 13-14, the method 500 includes mounting reference targets 120 on the bottom end 112 of the support frame and within the field of view of the cameras. After capturing images 140 that each contain at least three common reference targets 120, the calibration process includes analyzing, using the processor 170, the images 140 to determine, based on the reference targets 120, a scaling factor of the images 140 and/or three-dimensional locations of the cameras 130 relative to each other. In addition, the calibration process can include using photogrammetry techniques to compute the orientation of the local coordinate system 442 (FIG. 2) of the inspection system 100 relative to the global coordinate system 440 (FIG. 2) of the structure 300 using the reference targets 120 and recognized structural features 180. In some examples, the method 500 can also include measuring the temperature of the ambient air and/or the support frame 102 prior to and/or during an inspection, and compensating for thermal expansion or contraction of the support frame 102 during the calibration process and/or when processing the images 140 for surface reconstruction and/or defect detection.

Step 502 of the method 500 includes positioning the support frame 102 over the surface 310 to be inspected. As described above, the light sources 150 are mounted at different locations on the support frame 102. The cameras 130 each have a viewing direction 136 and are also mounted at different locations on the support frame 102 in a manner such that the viewing direction 136 of each camera 130 points generally toward a common region 312 of the surface 310 as shown in the example of FIG. 4. In some examples, the method 500 includes mounting the light sources 150 and/or the cameras 130 on the support frame 102 in a manner such that the light sources 150 and/or the cameras 130 are equiangularly spaced apart from each other when the inspection system 100 is viewed from a top-down perspective as shown in the example of FIG. 10. However, as mentioned above, the light sources 150 and/or the cameras 130 can be mounted at any location on the support frame 102, and are not limited to being equiangularly spaced apart from each other.

In some examples, step 502 of positioning the support frame 102 (i.e., the inspection system 100) over the surface 310 comprises positioning the support frame 102 at one or more different locations on the surface 310 via a movable platform 400 to which the support frame 102 is attached. For example, FIGS. 2-3 illustrate the support frame 102 attached to the end of a robotic arm 404 of a robotic device 402. As mentioned above, the robotic device 402 is movable along a robotic device track 406 for positioning the inspection system 100 at any location along the length of a structure 300 under inspection. In other examples not shown, step 502 of positioning the support frame 102 over the surface 310 can be performed using any one a variety of alternative movable platform configurations, such as an overhead gantry (not shown). In further examples, step 502 of positioning the support frame 102 over the surface 310 can include manually holding the support frame 102 in position over the surface 310 under inspection as shown in the above-described example of FIG. 5.

Referring briefly to the example of FIG. 7, the method 500 includes orienting the light sources 150 in a manner such that the lighting direction 156 of each light source 150 forms an angle of incidence 158 of 15-75 degrees with the common region 312. Preferably, the lighting directions 156 form an angle of incidence 158 of between 15-45 degrees to thereby maximize the shadow effects on the surface 310 under inspection. The method 500 can also include orienting the cameras 130 or adjusting the camera orientations such that the viewing direction 136 of each camera 130 is locally non-normal to the surface 310 under inspection, thereby enhancing the capacity of each camera 130 to capture shadows generated by irregularities or discontinuities in the surface 310.

The method 500 can further include changing the size and/or shape of the support frame 102 by changing the configuration of the beams 104 interconnected by the connecting elements 106, to thereby accommodate surfaces 310 of different sizes and/or shapes. In this regard, the size and/or shape of the support frame 102 can be changed by inserting the beam ends into different openings 116 in the connecting elements 106 and/or by changing the lengths of the beams 104. FIGS. 7, 12, and 13 illustrate three different versions of a wide variety of configurations of the support frame 102 that can be achieved by changing the length of the beams 104 and/or by changing the manner in which the beams 104 are interconnected via the connecting elements 106.

Step 504 of the method 500 includes temporarily activating the light sources 150 one at a time and causing all the cameras 130 to capture a respective plurality of images 140 of the common region 312 each time a light source is 150 is activated. For example, in an inspection system 100 having exactly three light sources 150 and exactly two cameras 130, the process of performing step 504 comprises activating only the first light source 151 and capturing images 140 of the common region 312 using the first and second camera 131, 132, activating only the second light source 152 and again capturing images of the common region 312 using the first and second camera 131, 132, and then activating only the third light source 153 and again capturing images of the common region 312 using the first and second camera 131, 132. As mentioned above, the images 140 are sent to the processor 170 for processing for generating a reconstructed surface 174 of the surface 310 under inspection.

In some examples, the method 500 includes at least partially blocking background light from impinging on the common region 312 of the surface 310 using a background light shield 160 that can be mounted to the support frame 102. For example, as shown in the above-described FIGS. 17-18, the method 500 can include attaching a light-blocking fabric (e.g., black polyester fabric) to the beams 104 and/or to the connecting elements 106 of the support frame 102. Alternatively, the background light shield 160 can be a rigid one piece-shell-like cover (not shown) formed of lightweight metallic material (e.g., aluminum) and/or lightweight polymeric material (e.g., carbon fiber composite material) that is removably attachable to the support frame 102. As an alternative to or in addition to using a background light shield 160 to block background light, the method 500 can include filtering out, using a lens filter 134 mounted on the lens of each of the cameras 130, one or more wavelengths of background light. When using such lens filters 134, the method 500 can include emitting light from the light sources 150 in at least one wavelength that is different than the wavelengths filtered out by the lens filter 134.

Step 506 of the method 500 includes processing the images 140 in a manner that results in a reconstructed surface 174 representing the topography of the common region 312. As described above, the processor 170 uses a photometric stereo algorithm to form the reconstructed surface 174 based on the images 140. In one example of processing the images, step 506 includes receiving the images 140 at the processor 170, which combines and processes the images 140 by camera 130, and indexes the images 140 by light source 150. For example, in the above-described inspection system 100 having exactly two cameras 130 (e.g., a first camera 131 and a second camera 132) and exactly three light sources 150 (e.g., a first light source 151, a second light source 152, and a third light source 153), step 506 includes combining the first, second, and third images 141, 142, 143 of the first camera 131, and combining the first, second, and third images 141, 142, 143 of the second camera 132.

Step 506 then includes using a photometric algorithm to generate a first digital surface (not shown) based on the first, second, and third images 141, 142, 143 captured by the first camera 131, and generating a second digital surface (not shown) based on the first, second, and third images 141, 142, 143 captured by the second camera 132. Step 506 then includes using the camera positions to align the first and second digital surfaces and generating a best fit surface (i.e., the reconstructed surface 174) after removing outliers and noise. Step 506 of processing the images 140 and generating the reconstructed surface 174 can be performed using any one of a variety of alternative optimization approaches for multi-view surface reconstruction to result in the reconstructed surface 174, and is not limited to the above-described process. As mentioned above, combining multiple images 140 taken from different viewing perspectives averages out nonuniform reflectance of the light across the surface 310 under inspection, which otherwise causes shape distortion in the reconstructed surface 174.

Referring to FIG. 25, shown is a method 600 of analyzing the reconstructed surface 174 for structural features 180, defects 200, and/or texture 206. Step 602 of the method 600 includes recognizing common structural features 180 in the images 140 of the surface 310 under inspection and, if present, masking out the structural features 180. As mentioned above, such structural features 180 can negatively impact the reliability and accuracy of the reconstructed surface 174. FIG. 23 shows a display screen 216 of a GUI 210 displaying images 140 of the surface 310 under inspection. Each of the images 140 has multiple structural features 180 in the form of fasteners 182. However, the fasteners 182 have been masked out and are therefore absent from the reconstructed surface 174 shown on the right hand side of FIG. 23.

Step 604 of the method 600 comprises detecting defects 200 using a suitable defect detection technique. In one example, step 604 comprises detecting defects 200 via robust surface fitting, which initially involves importing data (e.g., the reconstructed surface 174 and the corresponding images 140) into the algorithm, generating a robust polynomial surface fit of the data, and identifying the most deviant points of the polynomial surface fit. The points that exceed a predetermined threshold are removed to result in a new robust polynomial surface fit. Step 604 then includes producing a heatmap (not shown) of the data based on the new robust polynomial surface fit, and identifying defects 200 based on the deviant points in the heatmap. In another example, step 604 comprises detecting defects 200 via normal vector tracking, which involves extracting surface normals at each vertex of the reconstructed surface, computing an average angle between each surface normal and its neighbors, identifying points with angle variations that are greater than a predetermined maximum, and identifying defects 200 based on the points that have the largest angle variations between the surface normals and their neighbors.

Advantageously, the above-noted defect detection method 600 maintains and/or generates a relationship between two-dimensional data (i.e., the images 140) and three-dimensional data (i.e., the reconstructed surface 174), which facilitates the defect detection process. Advantageously, the method 600 uses the two-dimensional data (e.g., the images 140) to locate structural features, which is less computationally intensive than using the three-dimensional data (i.e., the reconstructed surface 174). In addition, the method 600 uses the three-dimensional data (i.e., the reconstructed surface 174) to perform the defect detection and measurement.

Regardless of the defect detection technique that is used, the method 600 includes step 606 of plotting and/or highlighting the location of the defects 200 in the reconstructed surface 174. In this regard, step 606 comprises classifying the defect types, which can be performed using machine learning or any other suitable defect classification techniques. Additionally, step 606 can include quantifying the parameters of each defect 200 by analyzing the reconstructed surface 174 once the location of the defect 200 is determined using the defect detection algorithm. For example, step 606 can include classifying the defects as scratches 202 in FIG. 21 and quantifying the scratch parameters in terms of the maximum depth and length of each scratch 202 (e.g., maximum depth of 0.005 inch, length of 2.3 inches, etc.). In FIG. 23, step 606 can include classifying the defect 200 as a gouge 204 in FIG. 23 and quantifying the gouge parameters in terms of its maximum width and depth, and its length (e.g., maximum width of 0.050 inch, maximum depth of 0.020 inch, length of three inches, etc.). Although not shown, step 606 can further include annotating the reconstructed surface 174 with the defect type (e.g., gouge, scratch, etc.), the defect parameters (e.g., maximum width, depth and length), and the x,y,z location of the defect relative to the original of the global coordinate system.

In addition to detecting defects 200 in a reconstructed surface 174, the method 500 can also include analyzing a reconstructed surface 174 for texture 206 (e.g., FIG. 24). For example, the method 500 can use known surface fitting methods or generate a profile line (not shown) on the reconstructed surface 174 for analyzing the texture 206 of a surface 310. The texture 206 can be characterized based on the distance between the peaks and adjacent valleys in a plot of the profile line. Analysis of the texture 206 of a surface 310 provides a means to better understand the characteristics (e.g., average surface roughness) of a base surface (not shown) and any surface coatings (e.g., paint—not shown) subsequently applied to the base surface, and can assist in determining the sizes of defects 200 are detectable when inspecting a surface 310.

In some examples, the method 500 includes displaying the images 140 and/or the reconstructed surface 174 on a graphic user interface (GUI 210). For example, FIG. 2 illustrates a GUI 210 of a laptop computer 212 displaying, in real-time, the images 140 captured by the cameras 130 while a robotic device 402 holds the inspection system 100 in position over a surface 310 under inspection. In another example, FIG. 5 illustrates a technician holding the inspection system 100 in position over the surface 310 while viewing, in real time, the images 140 and the reconstructed surface 174 on a GUI 210 that is mounted on the support frame 102. FIG. 19 shows the display screen 216 of FIG. 5 displaying the images 140 and the reconstructed surface 174 showing defects 200 in the form of scratches 202. FIG. 21 is an example of a display screen 216 displaying the images 140 and the reconstructed surface 174 containing a defect 200 (e.g., a gouge 204) in one of the skin panels 186 under inspection in FIG. 22.

Advantageously, combining multiple images 140 taken from different viewing perspectives reduces shape distortion in the reconstructed surface 174, and which allows for a high level of precision in detecting small defects 200 such as scratches 202 (e.g., FIG. 21), gouges 204 (e.g., FIG. 23), and other types of discontinuities. In addition, the highly accurate reconstructed surface 174 allows for analysis of small surface features such as texture 206, enabling the determination of the types and/or sizes of defects 200 that can be detected. In addition to analyzing a surface for small defects, the inspection system 100 also provides the ability to detect relatively large defects 200 (e.g., dents) in a surface 310.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. An inspection system for capturing a topography of a surface, comprising:
   a rigid support frame configured to be positioned over the surface;
   at least three light sources configured to be mounted at different locations on the support frame;
   at least two cameras each having a viewing direction and configured to be mounted at different locations on the support frame in a manner such that the viewing direction of each camera points generally toward a common region of the surface;
   a processor configured to:
     temporarily activate the light sources one at a time and cause all the cameras to capture a respective plurality of images of the common region each time a light source is activated;
     combine the images in a manner that results in a reconstructed surface representing the topography of the common region;
     analyze the reconstructed surface for structural features, defects, and/or texture; and
     mask out the structural features that can otherwise negatively impact the reliability and accuracy of the surface reconstruction process due to reflections, shadows, and/or other effects generated by the structural features, so that the structural features are absent in the reconstructed surface.

2. The inspection system of claim 1, further comprising:
   a graphic user interface (GUI) configured to display the reconstructed surface.

3. The inspection system of claim 2, wherein:
   the GUI is mountable on the support frame in a manner allowing viewing of the reconstructed surface while the support frame is held in position over the surface.

4. The inspection system of claim 1, wherein:
   at least one of the light sources is a directional light source having a lighting direction and mountable to the support frame in a manner such that the lighting direction forms an angle of incidence of 15-75 degrees with the common region.

5. The inspection system of claim 1, wherein:
   the light sources and/or the cameras are equiangularly spaced apart from each other when the inspection system is viewed from a top-down perspective.

6. The inspection system of claim 1, wherein:
the support frame is comprised of beams interconnected by connecting elements configured to allowing for changing the size and/or shape of the support frame for accommodating surfaces of different sizes and/or shapes.

7. An inspection system for capturing a topography of a surface, comprising:
a rigid support frame configured to be positioned over the surface;
at least three light sources configured to be mounted at different locations on the support frame;
at least two cameras each having a viewing direction and configured to be mounted at different locations on the support frame in a manner such that the viewing direction of each camera points generally toward a common region of the surface;
one or more reference targets mounted on a bottom end of the support frame;
a processor configured to:
temporarily activate the light sources one at a time and cause all the cameras to capture a respective plurality of images of the common region each time a light source is activated, and each of the cameras is oriented in a manner to include the reference targets in the images;
combine the images in a manner that results in a reconstructed surface representing the topography of the common region; and
analyze the images containing the reference targets and determine, using the reference targets, a scaling factor of the images and three-dimensional locations of the cameras relative to each other.

8. The inspection system of claim 1, further comprising at least one of the following:
a background light shield mountable to the support frame and configured to at least partially block background light from impinging on the common region of the surface;
a lens filter mountable on each of the cameras and configured to filter out one or more wavelengths of the background light, and the light sources are configured to emit light in at least one wavelength that is different than the wavelengths filtered out by the lens filter.

9. An inspection system for capturing a topography of a surface, comprising:
a rigid support frame;
a movable platform configured to position the support frame at one or more different locations on the surface;
at least three light sources configured to be mounted at different locations on the support frame;
at least two cameras each having a viewing direction and configured to be mounted at different locations on the support frame in a manner such that the viewing direction of each camera points generally toward a common region of the surface;
a processor configured to:
temporarily activate the light sources one at a time and cause all the cameras to capture a respective plurality of images of the common region each time a light source is activated;
combine the images in a manner that corrects for shape distortion and results in a reconstructed surface representing the topography of the common region;
analyze the reconstructed surface for structural features, defects, and/or texture; and
mask out the structural features that can otherwise negatively impact the reliability and accuracy of the surface reconstruction process due to reflections, shadows, and/or other effects generated by the structural features, so that the structural features are absent in the reconstructed surface.

10. A method of capturing a topography of a surface, comprising:
positioning a rigid support frame over the surface, the support frame having at least three light sources mounted at different locations on the support frame, and at least two cameras each having a viewing direction and mounted at different locations on the support frame in a manner such that the viewing direction of each camera points generally toward a common region of the surface;
temporarily activating the light sources one at a time and causing all the cameras to capture a respective plurality of images of the common region each time a light source is activated;
combining the images in a manner that results in a reconstructed surface representing a topography of the common region;
analyzing the reconstructed surface for structural features, defects, and/or texture; and
masking out the structural features that can otherwise negatively impact the reliability and accuracy of the surface reconstruction process due to reflections, shadows, and/or other effects generated by the structural features, so that the structural features are absent in the reconstructed surface.

11. The method of claim 10, further comprising:
displaying the reconstructed surface on a graphic user interface (GUI).

12. The method of claim 10, wherein displaying the reconstructed surface on the GUI comprises:
viewing the reconstructed surface on the GUI mounted on the support frame.

13. The method of claim 10, further comprising:
orienting at least one of the light sources in a manner such that a lighting direction of the light source forms an angle of incidence of 15-75 degrees with the common region.

14. The method of claim 10, wherein:
mounting the light sources and/or the cameras to the support frame in a manner such that the light sources and/or the cameras are equiangularly spaced apart from each other when the support frame is viewed from a top-down perspective.

15. The method of claim 10, wherein:
changing the size and/or shape of the support frame by changing an arrangement of a plurality of beams interconnected by a plurality of connecting elements, to thereby accommodate surfaces of different sizes and/or shapes.

16. The method of claim 10, further comprising:
mounting one or more reference targets proximate a bottom end of the support frame;
capturing, using the cameras, images of the reference targets; and
analyzing, using a processor, the images containing the reference targets and determining, based on the reference targets, a scaling factor of the images and three-dimensional locations of the cameras relative to each other.

17. The method of claim 10, further comprising at least one of the following:

at least partially blocking background light from impinging on the common region of the surface using a background light shield mounted to the support frame;

filtering out, using a lens filter mounted on each of the cameras, one or more wavelengths of the background light, and emitting light from the light sources in at least one wavelength that is different than the wavelengths filtered out by the lens filter.

18. The method of claim 10, wherein positioning the support frame over the surface comprises:

positioning the support frame at one or more different locations on the surface via a movable platform to which the support frame is attached.

19. The inspection system of claim 1, wherein the structural features comprise at least one of fasteners, section joins, and window surrounds.

20. The method of claim 10, wherein the structural features comprise at least one of fasteners, section joins, and window surrounds.

\* \* \* \* \*